Patented Oct. 23, 1951

2,572,071

UNITED STATES PATENT OFFICE 2,572,071

METAL RESINATES AND METHOD OF PREPARATION

William E. St. Clair and Ray V. Lawrence, New Orleans, La., assignors to the United States of America as represented by the Secretary of Agriculture No Drawing. Application July 11, 1950, Serial No. 173,223

33 Claims. (Cl. 260—105)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to new and improved metal resinates and to methods for their preparation. It also relates to improved metal resinates prepared from the condensation products of rosin materials, such as rosin derivatives, and rosin-containing materials with an aldehyde.

This invention is a continuation in part of applications, Serial No. 82,268, Serial No. 152,267, and Serial No. 152,268, all now abandoned.

We have found that novel and improved metal resinates may be prepared by reacting rosin or rosin derivative, an aldehyde and a source of a metal. The various modes of reaction and the variations in type of reactants will be explained in detail below.

The metal resinates prepared according to our invention are generally characterized by increased metal content, conchoidal fracture, and improved solubility in low solvency hydrocarbons. Our products are moreover generally more stable to heat and air, compared with prior metal resinates.

By "metal" we mean any of those elements considered to be metals in the "Periodic Chart of the Elements" which appears in "General Chemistry," 5th edition (1944) by H. G. Deming, published by John Wiley and Sons, Inc.

The rosin material employed in our invention includes gum rosin, wood rosin, pine oleoresin, material containing rosin or rosin acids such as pine gum, heat-treated rosin, stabilized rosin such as disproportionated rosin, partially hydrogenated or partially dehydrogenated rosin, and polymerized or partially polymerized rosin. It also includes such materials as decarboxylated rosin, rosin oil, tall oil, esters of the rosin acids, such as methyl abietate, ester gum, vacuum strippings from rosin reactions, or any rosin-containing material which will react with an aldehyde under the conditions of our process as described herein. Metal resinates may be prepared from any of these rosins, rosin-containing material, or rosin derivatives in accordance with our invention.

The aldehydes may be lower aliphatic aldehydes such as formaldehyde, acetaldehyde, and the like, carbocyclic or heterocyclic aldehydes such as benzaldehyde or furfural, or higher aliphatic aldehydes such as heptaldehyde, stearic aldehyde, and the like. The wide variety of aldehydes which may be employed is illustrated in the specific examples and tables which appear below. In general, substituted or unsubstituted aldehydes of from one to eighteeen carbon atoms are suitable. The aldehydes may be used in the form of gases, liquids or solids, and may be either linear or cyclic polymers of aldehydes such as paraformaldehyde, paraldehyde, or any polymer or compound which will yield an aldehyde under the conditions of our invention such as methylal, acetal, etc., aqueous solution of aldehydes and other compounds which yield aldehydes on heating or other compounds in which an aldehyde is released either before or during the course of the reaction. The expression "aldehyde-yielding material" as used in this application includes the aldehyde itself. The physical properties of the metal resinates obtained from rosin material and different aldehydes vary somewhat, yet all our resinates are generally characterized by the increased metal content, conchoidal fracture, an improved solubility as noted previouly.

The metal source may be the metal oxide, hydroxide, carbonate, basic carbonate, metal salt of organic or inorganic acids such as the formate, lactate, acetate, basic acetate; or in some cases the finely divided metal may be used.

The properties of the metal resinates when they are formed will be influenced to some extent by the kind and amount of the particular metal compounds used in preparation. If an acid resinate is desired, for example, we prefer to start with a rosin material which has been reacted with 5% or less of an aldehyde. For essentially neutral metal resinates or for those which contain more metal than can be accounted for by the number of carboxyl groups present, we prefer to employ a rosin material which has been reacted with more than 5% of an aldehyde, and to add more aldehyde as necessary.

Within the broad scope of our invention, the properties of the particular metal resinates will vary somewhat, depending upon the proportion and kind of reactants and the particular mode of carrying out the reaction. For instance, the color of the metal resinates is generally light, yet some are characterized by darker color than the rest. This darker color characterizes the metal resinates using formaldehyde. The various combinations of metal source, aldehyde and rosin material and variations in proportion of these ingredients lead to a wide range of products. It is to be understood, however that within these possible combinations there are rarely specific combinations which fail to produce resinates or which produce resinates not having the properties of metal content, fracture and solubility previously noted. These exceptions are, nevertheless few in number and do not detract materially from the operability of our broad method or the value of our broad class of products.

Our resins have the unique property of high solubility in the low solvency hydrocarbons, such as petroleum naphtha. These novel resins may be used as protective coatings, catalytic drying agents for unsaturated vegetable oil, fungicides, insecticides, bactericides, wood preservatives, surface undercoatings, mildewproofing agents, rustproofing agents, wetting and dispersing agents, lubricating agents, waterproofing agents, catalysts, glazing ceramics, etc. Other and further important advantages of our resinates will become apparent from the following descriptions and examples.

The aldehyde may be reacted with rosin in several different ways. The amount of aldehyde giving the desired effects may vary from 0.01% to 30% based on the weight of the rosin material used.

A product that usually gives very satisfactory resinates may be formed by mixing the rosin and from 1% to 5% aldehyde together and heating to about 120 to 230° C. or higher without agitation. In cases where resinates of maximum metal content are desired, it may be advantageous to add more aldehyde as the metal compound is added. In some cases it may be advantageous to mix the aldehyde with the metal compound and add the mixture slowly to the hot rosin. Another method of preparation is to add the aldehyde to the molten metal resinate. In most cases it is advantageous to form the rosin-aldehyde reaction product first and to react this product with suitable metal compounds to form the metal resinate or mixed metal resinate. However, suitable resinates were prepared by mixing all the ingredients together and heating the mixture with or without mechanical agitation until the aldehyde refluxed, and then removing volatile substances from the reaction mixture, as necessary.

The rosin and aldehyde may be combined in a closed vessel under pressures greater than atmospheric. Such products may contain higher amounts of aldehyde than those reacted at atmospheric pressures. While metal resinates prepared from these products of high aldehyde content are usually less soluble in the low solvency hydrocarbon solvents than similar products prepared at atmospheric pressure, these resinates usually have better resistance to oxidation than resinates of low aldehyde content. It may also be advantageous to carry out the preparation of these resinates under an inert atmosphere. The rosin-aldehyde reaction product may be saponified with aqueous sodium hydroxide and the desired metal resinates formed by precipitation in dilute aqueous solution. However, many such resinates are almost completely insoluble in the common varnish solvents and do not lie within the scope of this invention.

While a catalyst may be used, and in some cases it may be desirable to catalyze the rosin-aldehyde reaction, we have found that in this process a catalyst was not necessary for the reaction of rosin with an aldehyde as very satisfactory products were prepared without the use of a catalyst. However, satisfactory products were also prepared by using an acid to catalyze the rosin-aldehyde reaction.

While the reaction of rosin and an aldehyde may be carried out in the presence of acetic acid and this product reacted with a suitable metal compound, the product formed in this manner is dissimilar to that product which is formed by the reaction of rosin and an aldehyde with a metal acetate. The rosin-aldehyde-acetic acid-metal compound product is usually not as soluble in the low boiling petroleum hydrocarbons as the rosin-aldehyde-metal acetate reaction product.

The process herein described may be applied generally to include the products which may result when rosin or pine gum containing one or more of the resin acids, or stabilized rosin, such as disproportionated rosin, partially hydrogenated or partially dehydrogenated rosin are treated with a suitable metal compound in conjunction with, prior to, or subsequent to the reaction with an aldehyde.

Also, the process as herein described may be applied generally to include the products which may result when rosin oil, tall oil, or esters of the resin acids, such as methyl abietate, ester gum, etc., are treated with a suitable metal compound in conjunction with, prior to, or subsequent to the reaction with an aldehyde. However, the products obtained by using these derivatives of rosin may vary widely in melting point, solubility, and other physical and chemical properties, etc., from those obtained with rosin.

In referring to metal resinates having a high metal content, we do not mean to limit ourselves to acid or even neutral metal resinates, but also to include products containing more metal than that required to react completely with the free carboxyl groups present. When we refer to the properties of these metal resinates, we refer to the property of the materials as a whole. This is done to avoid any controversy over whether the metal resinate itself or the concomitant impurities are responsible for the observed properties.

The metal acetate is a convenient source of the metal to use in the preparation of these products, but other forms of the metal, such as the metal oxide, hydroxide, formate, lactate, carbonate, basic acetate, basic carbonate, or in some cases the finely divided metal may be used, as noted previously.

One technique that was found to be effective for some of the less active metal compounds (such as molybdenum oxide, tungsten oxide, and bismuth subcarbonate) was to make a slurry of the metal compounds in glacial acetic acid, and add the slurry slowly to the hot rosin-aldehyde reaction product. It was also found helpful in several cases to use the freshly precipitated hydroxide or basic carbonate of some of the less active metals in glacial acetic acid prior to reaction with the rosin-aldehyde reaction product. In all cases where the acetate of the metal was available or could be formed a satisfactory metal resinate could be prepared.

Since the metals below hydrogen in the electromotive series usually form resinates that have lower decomposition temperatures than the metals above hydrogen it is necessary to carry out the preparation of such resinates at temperatures well below their decomposition point. When such resinates are prepared from the metal salt of a volatile carboxylic acid such as an acetate, it is usually desirable to remove the excess volatile acid by sparging with steam or an inert gas or by vacuum stripping.

Also, the choice of metal compound used to react with the rosin-aldehyde reaction product will influence the physical characteristics of the metal resinate. For instance, in preparing lead resinates if the basic lead carbonate is used the lead resinate prepared will be intermediate in color, high in melting point and solubility, whereas, if lead acetate is used the lead resinate will be lighter in color, lower in melting point and less soluble. These differences are apparent when the physical characteristics of the appended examples are compared at equivalent metal concentrations.

In order to avoid decomposition, it is usually desirable to prepare the resinates of such metals as copper or mercury at temperatures of the order of 100 to 130° C. while manganese resinates that have been heated at 400° C. for 30 minutes were still clear, homogeneous solids with softening points above 100° C.

If higher concentrations of volatile liquid aldehydes are desired, the reaction may be carried out in a closed reaction vessel under pressure to prevent loss of the aldehyde, or the entire reaction may be carried out under pressure greater than atmospheric, if desired.

Reactions involving more than 5% of a volatile aldehyde may be carried out in a closed reaction vessel under pressure, or in a vessel equipped with a reflux condenser. In this manner the metal compound can be added to the rosin-aldehyde mixture and the whole of the reactants refluxed until the reaction is completed. In some cases it is advantageous to remove some of the more volatile components after the reaction is completed. This can be accomplished by the usual methods, such as sparging with steam, sparging with an inert gas, or by vacuum stripping.

While the products prepared by our method are in some respects similar to some of the present metal resinates, there is considerable difference in many of their physical and chemical properties. These products prepared with an aldehyde show much greater solubility in the low solvency hydrocarbons, such as petroleum naphtha, than is shown by metal resinates prepared in the absence of an aldehyde.

We have found that mixtures of the aldehydes may be used advantageously to modify the rosin for the preparation of these metal resinates. In many cases the resinates obtained from the mixed aldehyde gave color grades better than those obtainable from either aldehyde used alone.

The properties of these metal resinates may also be varied to a considerable extent by using mixtures of two or more different metal compounds. For example, the melting point of zinc resinate may be increased by substituting equivalent amounts of calcium hydroxide for a part of the zinc oxide.

Solution stability, particularly with the common drier metals (cobalt, lead and manganese), may be obtained by the preparation of a single resinate containing a mixture of the desired metals.

In general, as the metal content of a particular resinate is increased, the melting point is increased and the color of the product is darkened. The color is darker with some aldehydes and with some metal compounds than with others.

The following are among the variables that influence the physical and chemical characteristics of the various metal resinates.

1. Kind of aldehyde used.
2. Concentration of aldehyde used.
3. The particular metal used.
4. The individual salt of a particular metal used.
5. Concentration of metal used.
6. The type of rosin or rosin derivative used.
7. Reaction temperature.
8. Reaction time.

The metal resinates prepared by our method have improved solubility characteristics in the common varnish solvents, such as petroleum naphtha, turpentine, mineral spirits, aromatic type solvents, and terpene hydrocarbons.

The rates of solution of the resinates listed in the examples were determined by crushing approximately 2 grams of the resinate to pass an eight-mesh screen and adding the required amount of solvent at room temperature and determining the time required to dissolve the sample by shaking on an automatic shaking machine.

Our invention is advantageous in that our method permits the preparation of metal resinates which are difficult if not impossible to prepare by prior methods for preparing resinates. For example, in the known reaction of rosin with metal compounds to form metal resinates, the reaction apparently proceeds in the expected manner with the formation of a metal abietate or in some cases to form a mixed salt, such as the metal acetate-abietate, and in either case the metal content obtainable appears to be limited by the number of carboxyl groups available. However, we have discovered that such rosin derivatives as methyl abietate, ester gum, decarboxylated rosin, or rosin oil, having acid numbers of less than 20, when reacted with an aldehyde, would react with a suitable metal compound, such as the metal acetate to yield a clear, homogeneous, refusible metal resinate completely soluble in the ordinary varnish solvents. Likewise, when the higher molecular weight aldehydes are incorporated into rosin they produce metal resinates of improved color and solubility compared to the metal resinates prepared using formaldehyde. Liquid decarboxylated rosin with an acid number of less than 20, when reacted with 5% of benzaldehyde gave a product which contained more metal than could be accounted for by the reaction of the carboxyl groups with the metal compound to form either the metal diabietate, or the mixed abietate-acetate. The reaction must therefore proceed by a different mechanism than it does in the case of the rosin-metal compounds prepared in the absence of an aldehyde.

It is known that some metal compounds, when reacted with rosin, frequently set into a semi-crystalline infusible mass at concentrations of the metal far short of that which would theoretically neutralize the acid present in the rosin. Some of these products cannot be liquefied at temperatures below their decomposition point. When the reaction is carried out in a petroleum solvent, greater amounts of the metal compound may be added without "blocking" or "gelling" of the solution, but when the solvent is distilled from the reaction product, a semi-crystalline, infusible residue remains.

We have found that when a suitable metal compound is reacted with a rosin or rosin derivative in the presence of an aldehyde, this tendency to block is avoided and a homogeneous, clear, metal resinate, more soluble in hydrocarbon solvents than the metal resinate which has been prepared without the use of an aldehyde, is formed.

Specific metal resinates which can be prepared by this invention are those of iron, nickel, vanadium, copper, titanium, manganese, zinc, cobalt, lead, aluminum, calcium, magnesium, barium, strontium, molybdenum, tin, and others, as described in the examples appearing in this specification. Included are many resinates which have not been prepared prior to this invention. Included also are many metal resinates which although known as such, nevertheless have a higher metal content than has heretofore been possible due to the phenomenon of blocking.

In general the metal resinates may be prepared at temperatures of from 90° C. to 400° C. depending on the type of rosin material used, the specific aldehyde used, and the specific metal compound of a particular metal used. For instance, rosin oil can be reacted with some aldehydes and some metal compounds at temperatures as low as 90° C. and some rosins can be reacted with some metal compounds as high as 400° C. Generally, the metal resinates of the metals below hydrogen in the electromotive series can be prepared at temperatures of 90–120° C. even when rosin is used as the starting material, however the particular rosin material used has to be in a molten state when the aldehyde is reacted. For metals above hydrogen in the electromotive series the preferred range of reaction lies within the range of 120° C. to 320° C., although some resinates containing a relatively high proportion of metal may require slightly higher temperature. Some resinates such as those of lead and nickel tend to decompose at the higher temperatures. In such instances we employ 120° C. up to the decomposition point as the preferred range.

The phenomenon of blocking, or setting up into a semi-crystalline mass, for example, characterizes prior manganese resinates. Prior to this invention when manganese resinates of more than 3.5% manganese were desired it was necessary to prepare them by the precipitation method. Such precipitated resins are inferior to refusible resinates in solubility and color. A preferred source of manganese is manganese acetate, but other compounds of manganese, such as the salts of organic acids, particularly the lower members of the fatty acid series and such manganese compounds as manganese dioxide, carbonate, basic carbonate, hydroxide, etc., or various mixtures of suitable compounds may be used. It is to be understood that the products formed with different manganese compounds may be somewhat different from those prepared with manganese acetate.

While 5% of an aldehyde is a convenient amount of the aldehyde to use in the preparation of manganese resinates, we are in no way limiting ourselves to this amount, since with high concentrations of manganese, more aldehyde may be desirable, and with small amounts of manganese less is necessary. Clear, homogeneous, petroleum naphtha-soluble manganese resinates containing more than 4% manganese have been prepared from rosin and rosin derivatives and rosin-containing materials which had been reacted with from 0.01% to 30% of an aldehyde.

In general, it is preferred to react the aldehyde with the rosin or rosin derivatives without agitation at temperatures below 170° C. and then to commence the agitation while the temperature is gradually raised to about 230° C. before the manganese is added. However, with manganese resinates containing up to 8.5% manganese prepared using an aldehyde, we prefer to add all the materials together and heat with agitation to about 260° C. before pouring. In this way a product of light color, soluble in petroleum naphtha, can be prepared in a minimum amount of time.

It is usually desirable to react the manganese acetate with the rosin-aldehyde product at temperatures of 250–275° C. and in those resinates which contain 7% to 9% manganese to remove the heat as soon as possible after the desired amount of manganese has been incorporated in the resinate. Since prolonged heating of the rosin-aldehyde-manganese acetate reaction products sometimes causes a partial precipitation of the manganese. This is particularly true of those resinates containing approximately one gram equivalent weight of manganese acetate for each gram equivalent weight of rosin acid.

The reaction of rosin and the aldehyde may be carried out in a closed reaction vessel under pressure, to prevent loss of the aldehyde or the entire reaction with the aldehyde and manganese acetate may be carried out under pressure greater than atmospheric, if desired.

The improved resistance to blocking can be shown since in the presence of from 0.01% to 30% of an aldehyde, a large excess of manganese acetate, above that which will theoretically react with the acid groups present in the rosin or rosin derivative, may be added to the reaction mixture at temperatures of from 140–400° C. without causing the product to block.

One hundred parts of rosin having an acid value of 168 requires only about 37 parts of manganese acetate tetrahydrate to form the manganese diabietate. However, we have found that 74 parts of manganese acetate tetrahydrate can be reacted with a mixture of 50 parts of methyl rosinate, 50 parts of rosin and 5 parts of paraformaldehyde, to give a clear, homogeneous, petroleum naphtha-soluble resinate.

It was found that the semi-crystalline infusible mass formed by heating a mixture of rosin and manganese acetate could be converted to a resinous state by the addition of an aldehyde to the blocked mass at temperatures in excess of 260° C.

The aldehydes containing from 1 to 5 carbon atoms are usually more effective in making manganese resinates than those of higher molecular weight and since these aldehydes are usually cheaper we prefer to use them. We have also found that mixtures of aldehydes are frequently more effective than any of the pure aldehydes present in the mixture.

The rosin-dihydropyran reaction product forms a manganese resinate of pale color and good solubility characteristics. In this case the dihydropyran ring probably opens to give an aldehyde.

The resinates prepared from formaldehyde-modified rosin usually have higher melting points than those resinates prepared from the higher aldehydes. The exact function of the aldehyde in this reaction is not clearly understood, however, a reactive aldehyde group seems to be essential since aldehyde free para-n-butyraldehyde does not affect the blocking tendency of the resinate until a drop of mineral acid is added to the polymer to release the aldehyde.

While the addition of as little as 0.01% of some aldehydes to the rosin brings about a noticeable improvement, as much as 30% aldehyde can be used in the preparation of these resinates, as previously noted. Thus, as much as 35% of manganese acetate may be reacted with a rosin-formaldehyde reaction product, containing 0.01% formaldehyde, without blocking at temperatures of 230–300° C. With larger amounts of an aldehyde more manganese acetate may be added without blocking.

The preparation of aldehyde-modified manganese resinates by this reaction is not limited to acidic derivatives of rosin but take place with such neutral products as rosin oil and rosin esters. In fact we have found it possible to prepare aldehyde-modified manganese resinates of much higher manganese content from a practically neutral rosin derivative such as rosin oil than from ordinary rosin. It is sometimes advantageous to use mixtures of these neutral rosin derivatives with rosin to decrease the melting point and increase the manganese concentration of the final product.

Thus, when equal parts of methyl rosinate and rosin are reacted with an aldehyde, as much as 74 parts of manganese acetate may be reacted with 100 parts of this mixture to give a clear, homogeneous product at reaction temperatures of 220–270° C.

If a product of low melting point is desired, methyl rosinate (the methyl ester of rosin) may be used as the starting material. By reacting 100 parts of methyl rosinate with 5 parts of paraformaldehyde, a product is obtained which will react with 41 parts of manganese acetate at temperatures as low as 100° C. to yield a clear, homogeneous, manganese resinate which is soluble in petroleum naphtha. This product is a viscous liquid at room temperature.

Similarly, when rosin oil or tall oil is reacted with an aldehyde, the resulting product may be reacted with manganese acetate to give a clear, homogeneous, petroleum naphtha-soluble manganese resinate which is a viscous liquid at room temperature.

Since manganese resinates usually have rather high melting points we have found it advantageous to add small amounts of liquid rosin derivatives such as rosin oil, methyl abietate, etc. Thus, when 100 parts of rosin were reacted with 5 parts of formaldehyde, and to the reaction product was added 1 part of rosin oil and this mixture was then reacted with 45 parts of manganese acetate, a clear, homogeneous manganese resinate was produced which had a lower melting point, and increased solubility, compared with a manganese resinate made in the absence of the rosin oil.

In referring to manganese resinates having a high manganese content, we do not mean to limit ourselves to acid or even neutral manganese resinates, but also to include products containing more manganese than that required to react completely with the carboxyl groups present.

When we refer to the properties of these manganese resinates, we refer to the property of the materials as a whole. This is done to avoid controversy over whether the manganese resinate itself or the concomitant impurities are responsible for the observed properties.

Zinc resinates according to this invention, may be made either by fusion reaction (i. e. a reaction carried out under conditions such that one or more of the reactants is in a fused state) or by reaction in solvent media.

In the reaction of rosin with zinc compounds to form zinc resinates by prior methods, the reaction apparently proceeds with the formation of a zinc abietate or in some cases to form a mixed salt, such as zinc acetate-abietate. In either case the zinc content obtainable appears to be limited by the number of carboxyl groups available. However, we have discovered that such rosin derivatives as methyl abietate, ester gum, decarboxylated rosin, or rosin oil, having acid numbers less than 20, after being reacted with an aldehyde will react with a suitable zinc salt, such as zinc acetate, to yield a clear, homogeneous and permanently refusible zinc resinate completely soluble in the ordinary varnish solvents. Liquid decarboxylated rosin with an acid number of 20, when reacted with 5% of paraformaldehyde, gave a product that would react with an equal weight zinc acetate to form a zinc resinate of H grade with a melting point of 129° C. (ball and ring). Since such zinc compounds contain more zinc than can be accounted for by the reaction of the carboxyl groups with zinc to form either the zinc abietate or the mixed abietate-acetate, the reaction must proceed by a different mechanism than it does in the case of the rosin-zinc compounds prepared in the absence of an aldehyde.

While zinc oxide is a convenient compound to use in the preparation of zinc resinates, other forms of zinc, such as finely divided zinc metal or zinc salts, which will react with the rosin, such as zinc acetate or formate may be used. It is to be understood that in some cases the products formed with different zinc salts will be somewhat different from those prepared with zinc oxide.

If an acid zinc resinate is desired, we prefer to start with a rosin which has been reacted with less than 5% of aldehyde, such as formaldehyde and, in general, for resinates containing between 5% and 8.5% of zinc, we prefer to use less than 1% of formaldehyde.

In general, it is also preferred to react the aldehyde with the rosin without agitation at temperatures below about 150° C. particularly those resins in which less than 1% of aldehyde is to be added, and then to commence the agitation while the temperature is gradually raised to about 230° C. before the zinc is added.

Thus, with 5% of formaldehyde, 14.0% of zinc oxide may be added and with 0.1% formaldehyde, 8.4% of zinc oxide may be added.

Also, it was found by using 8% of formaldehyde, up to as much as 12 parts of zinc oxide could be added and all of the ingredients mixed together and heated to about 250° C. without blocking to form a permanently refusible resin. However, we prefer to react the rosin with about 5% of formaldehyde first by heating the mixture of rosin and formaldehyde up to 150° C. without agitation and adding additional formaldehyde as desired with agitation. In this manner is was found that considerable quantities of formaldehyde could be reacted with rosin without undue loss of the vapors of formaldehyde. We prefer to add zinc oxide slowly to this reaction product at temperatures in excess of 230° C. with agitation.

However, when higher concentrations of formaldehyde are desired, the reaction of rosin and formaldehyde may be carried out in a closed reaction vessel under pressure to prevent loss of the formaldehyde, or the entire reaction with formaldehyde and the zinc compound may be carried out under pressure greater than atmospheric, if desired.

If an organic acid is used to catalyze this reaction, we prefer to place all constituents together in a petroleum solvent; however, these preferences are to be in no way limiting upon our method or product as will be shown herein below.

The improved resistance to blocking can be shown, since in the presence of about 8% or more of formaldehyde, a large excess of zinc oxide above that which will theoretically react with the acid groups present may be added to the reaction mixture at 250° C. without causing the product to block. The excess zinc oxide remains in suspension in the product with no apparent harmful effects.

It was also found that the semi-crystalline infusible mass formed by heating a mixture of rosin and zinc oxide could be converted to a resinous state by the addition of formaldehyde to the blocked mass at about 250° C.

While the products prepared by the methods described here are in some respects similar to the commercial zinc resinates, there is considerable difference in some physical and chemical properties. These compounds prepared with an aldehyde show much greater solubility in the low solvency hydrocarbons than is shown by zinc resinates of comparable zinc content prepared from rosin or mixtures of rosin and polymerized rosin. The viscosities of the solutions of zinc-rosin-aldehyde reaction products are usually lower than the viscosities of comparable products prepared without an aldehyde.

In general, as the amounts of formaldehyde and zinc used are increased the melting point of the product increases and the color of the product becomes darker. The color is also darker with some aldehyde derivatives than others, for example, the hexamethylenetetramine zinc resinate gave products darker than D grade rosin, whereas, the products formed with aqueous formalin solutions were only slightly darker than than the original rosin.

The properties of zinc resinates made from aldehydes other than formaldehyde will be apparent from the specific data presented in this specification.

Of particular interest are resinates in which calcium is substituted for a portion of the zinc. These mixed calcium-zinc resinates have higher melting points than the corresponding zinc resinates prepared from aldehyde-modified rosin. These mixed resinates are prepared simply by substituting equivalent amounts of calcium compounds, for example calcium hydroxide, for the zinc compound in a zinc resinate preparation as described in the foregoing paragraphs. These calcium-zinc resinates are of particular importance wherein the calcium to zinc ratios are one or less, the total metal ions being preferably no more than that required for stoichiometric reaction with the carboxyl groups of the rosin material. The properties of a representative number of specific calcium-zinc resinates are presented in the specific examples.

The cobalt and nickel resinates of our invention are of specific importance. For example, in prior processes, it has heretofore been necessary to use such constituents as partially polymerized or heat treated rosin to obtain a cobalt resinate containing more than 4% cobalt. When a cobalt compound is reacted with rosin in the presence of an aldehyde, its normal tendency to block is avoided, and a permanently refusible, homogeneous product is formed.

One hundred parts of a rosin having an acid value of 168 requires only about 38 parts of cobalt acetate tetrahydrate to form the cobalt diabietate. When the rosin has been previously reacted with about 2 to 4% of an aldehyde, 100 parts of cobalt acetate can be reacted with 100 parts of this rosin-aldehyde product. With as little as 0.01% of an aldehyde, 41 parts of cobalt acetate tetrahydrate can be reacted with 100 parts of rosin. Also, with 25% of formaldehyde, as much as 350 parts of cobalt acetate tetrahydrate can be reacted with 100 parts of rosin without blocking, although, at such high cobalt concentrations a noticeable precipitate is formed during the reaction.

In general, as the amount of an aldehyde used is increased, the solubility of the corresponding cobalt resinate increases and the time for the reaction to go to completion decreases. It is easy to follow the course of the reaction, since as the cobalt acetate reacts, the color of the reaction mixture usually changes from a purple to a deep blue.

When a soluble cobalt resinate of very high metal content is desired, the more soluble, deep blue cobalt resinate can be prepared by reacting cobalt acetate with the rosin-aldehyde product until the color changes from blue to purple. More aldehyde will change the color to blue again and then more cobalt acetate can be reacted. This procedure may be repeated until the desired cobalt content is reached.

Nickel resinates are somewhat more difficult to prepare than the corresponding cobalt resinates. The nickel resinates have melting points similar to those of zinc, but are clear green in color. Nickel resinates tend to decompose at comparatively low temperatures, i. e. 265–270° C.

Aluminum resinates differ in several respects from all other resinates prepared. They have unusually high melting points and they seem to be characterized by very high temperatures of reaction and decomposition. Aluminum resinates generally have melting points in excess of 220° C., and do not decompose when heated at 370° C.

All aluminum resinates seem to have a high solubility, i. e. from 10 to 50% in petroleum naphtha, also soluble in varsol and turpentine. They all have a very fast rate of solution, i. e. they dissolve in from 5 minutes to several hours. However, the aluminum resinates generally set into a gel on standing after being dissolved in solvent. These gels are unique in that the whole of the material is gelled, that is, solvent also, and the gels are very stable. Even shaking them on a shaking machine only causes the material to break temporarily, and upon again standing a short while, no change is apparent in the gel.

These resinates may find uses in such materials as greases and lubricants where a gel is desirable, and particularly a stable gel which is clear and colorless, i. e. as textile greases. In textile greases a clear, colorless grease is necessary which will leave no stain if splashed on the fabric.

The following examples are intended to be illustrative of the invention only. It is to be understood that they are not to be considered as limiting. For instance, the metal contents of the resinates prepared, in many cases, are maxima or are greater than found in the resinates of present day commerce. In every instance resinates may be made of lower metal content than illustrated, by the method of our invention.

EXAMPLES 1–15

One hundred parts of WW gum rosin were heated to about 130° C. without agitation. Agitation was commenced and the temperature was raised as indicated in the following table. At this temperature, the metal compounds listed below were added in the amounts as indicated. The metal resinates prepared in this manner without the use of an aldehyde exhibited the properties and characteristics shown in Table 1.

raised to 230° C. A cerium compound, prepared by dissolving 20 parts of cerium oxalate in nitric acid, precipitating with sodium hydroxide, and after washing and drying, dissolving the material in acetic acid and adding this solution to the hot rosin. The temperature was raised to 270° C. and after 3 hours had not cleared. The reaction product had a heavy white precipitate present and was opaque.

EXAMPLES 17–45

One hundred parts of WW gum rosin were heated with an aldehyde as listed in the table below to about 130° C. without agitation. Agitation was commenced and the metal compound in the amounts and types as indicated in the table

*Table 1*

METAL RESINATES WITHOUT AN ALDEHYDE

| Example number | 1 | 2 | 3 | [1] 4 | [1] 5 | 6 |
|---|---|---|---|---|---|---|
| Rosin, parts by weight | 100 | 100 | 100 | 100 | 100 | 100. |
| Metal compounds, parts by weight | 20 | 11 | 25 | 10 | 6 | 22.6. |
| Metal compounds | $NaC_2H_3O_2$ | $Ca(OH)_2$ | $Zr(C_2H_3O_2)_4$ | $H_4V_2O_7$ | $MoO_3$ | $Mn(C_2H_3O_2)_2 \cdot 4H_2O$. |
| Reaction time, hours | 3 | 2 | 3 | 3 | 3 | 2. |
| Maximum reaction temperature, °C | 275 | 280 | 280 | 270 | 300 | 310. |
| Reaction product | ppt. hot in naphtha. | Gelled | OPAQ | Black OPAQ | Black OPAQ | Blocked. |
| Solubility in petroleum naphtha | Incompletely sol. | Heavy ppt | Heavy ppt | Heavy black ppt | Heavy black ppt | ppt. Incompletely sol. |

| Example number | 7 | 8 | 9 | 10 | 11 |
|---|---|---|---|---|---|
| Rosin, parts by weight | 100 | 100 | 100 | 100 | 100 |
| Metal compounds, parts by weight | 15 | 16.4 | 30 | 30 | 6.5. |
| Metal compounds | $FeCO_3$ | $Co(C_2H_3O_2)_2 \cdot 4H_2O$ | $Ni(C_2H_3O_2)_2 \cdot 4H_2O$ | $Cu(C_2H_3O_2)_2 \cdot H_2O$ | $Zn(C_2H_3O_2)_2 \cdot 2H_2O$. |
| Reaction time, hours | 3 | 3 | 3 | 3 | 2. |
| Maximum reaction temperature, °C | 270 | 300 | 260 | 130 | 300. |
| Reaction product | OPAQ | Blocked | OPAQ. Brown | OPAQ. Green | Blocked. |
| Solubility in petroleum naphtha | completely ppt. | Heavy ppt | Black ppt | Heavy green ppt | Heavy ppt. |

| Example number | 12 | 13 | 14 | [1] 15 |
|---|---|---|---|---|
| Rosin, parts by weight | 100 | 100 | 100 | 100. |
| Metal compounds, parts by weight | 6.0 | 16.7 | 35 | 15. |
| Metal compounds | $ZnO$ | $Al(OH)(C_2H_3O_2)_2$ | $2PbCO_3 \cdot Pb(OH)_2$ | $Sb_2O_3$. |
| Reaction time, hours | 2 | 1½ | 3 | 2. |
| Maximum reaction temperature, °C | 275 | 320 | 260 | 220. |
| Reaction product | Blocked | Blocked | White | Gray glazed. |
| Solubility in petroleum naphtha | Heavy ppt | Gells ppt | Heavy ppt | Heavy gray ppt. |

[1] The metal compounds used in Examples 4, 5, and 15 were slurried in acetic acid and added as a slurry to the hot rosin.

EXAMPLE 16

One hundred parts of WW gum rosin were heated to about 130° C. without agitation. Agitation was commenced and the temperature was following were added slowly as the temperature was gradually brought to that indicated in the table. After the reaction time as listed, the products had the characteristics shown in Table 2.

*Table 2*

METAL RESINATES PREPARED FROM ALDEHYDE-MODIFIED ROSIN

| Example number | 17 | 18 | 19 | 20 | 21 |
|---|---|---|---|---|---|
| Rosin, parts by weight | 100 | 100 | 100 | 100 | 100. |
| Aldehyde, parts by weight | 5 | 5 | 5 | 5 | 3. |
| Aldehyde | Paraformaldehyde. | Paraldehyde | Paraformaldehyde. | Paraldehyde | Paraformaldehyde. |
| Metal compounds, parts by weight | 26.8 | 25 | 11.5 | 10 | 39. |
| Metal compounds | $NaC_2H_3O_2$ | $NaC_2H_3O_2$ | $Ca(OH)_2$ | $Ca(OH)_2$ | $Mn(C_2H_3O_2)_2 \cdot 4H_2O$. |
| Reaction time, hours | 3 | 6 | 3 | 6 | 3. |
| Maximum reaction temperature, °C | 250 | 280 | 320 | 320 | 250. |
| Color grade | F | G (off color) | F | B | H. |
| Melting point, ring and ball, °C | 120 | 225 | ([1]) | 168 | 141. |
| Time in hours to dissolve 20% solids in petroleum naphtha (B. P. 95–115° C.) | Sol. in $H_2O$ | Sol. $H_2O$, Sol. Alc. 1½. | 3 | 1½ | 5. |

[1] Melting point sample shattered on cooling.

Table 2—Continued
METAL RESINATES PREPARED FROM ALDEHYDE-MODIFIED ROSIN—Continued

| Example number | 22 | 23 | 24 | 25 | 26 |
|---|---|---|---|---|---|
| Rosin, parts by weight | 100 | 100 | 100 | 100 | 100. |
| Aldehyde, parts by weight | 5 | 5 | 5 | 1 | 5. |
| Aldehyde | Acetaldehyde | Paraformaldehyde | Paraldehyde | Paraformaldehyde | Paraldehyde. |
| Metal compounds, parts by weight | 40 | 15 | 15 | 82 | 39. |
| Metal compounds | $Mn(C_2H_3O_2)_2 \cdot 4H_2O$ | $FeCO_3$ | $FeCO_3$ | $Co(C_2H_3O_2)_2 \cdot 4H_2O$ | $Co(C_2H_3O_2)_2 \cdot 4H_2O$. |
| Reaction time, hours | 3 | 2 | 4 | 2 | 5. |
| Maximum reaction temperature, °C | 275 | 270 | 260 | 260 | 275. |
| Color grade | F | B | B | Blue | Blue. |
| Melting point, ring and ball, °C | 152 | 106 | 90 | 154 | 108. |
| Time in hours to dissolve 20% solids in petroleum naphtha (B. P. 95-115° C.) | 8 | 1 | 1/12 | 1/6 | 1/2. |

| Example number | 27 | 28 | 29 | 30 | 31 |
|---|---|---|---|---|---|
| Rosin, parts by weight | 100 | 100 | 100 | 100 | 100. |
| Aldehyde, parts by weight | 5 | 5 | 5 | 5 | 5. |
| Aldehyde | Paraformaldehyde | Paraldehyde | Paraformaldehyde | Paraldehyde | Flake Paraformaldehyde. |
| Metal compounds, parts by weight | 34 | 34 | 31 | 31 | 10. |
| Metal compounds | $Ni(C_2H_3O_2)_2 \cdot 4H_2O$ | $Ni(C_2H_3O_2)_2 \cdot 4H_2O$ | $Cu(C_2H_3O_2)_2 \cdot H_2O$ | $Cu(C_2H_3O_2)_2 H_2O$ | ZnO. |
| Reaction time, hours | 4 | 7 | 3 | 15 | 6. |
| Maximum reaction temperature, °C | 260 | 230 | 130 | 130 | 250. |
| Color grade | Green | Green | Green | Green | E. |
| Melting point, ring and ball, °C | 127 | 160 | 100 | 102 | 117. |
| Time in hours to dissolve 20% solids in petroleum naphtha (B. P. 95-115° C.) | 1/2 | 1 | 1/6 | 1/2 50% solids | 3/4. |

| Example number | 32 | 33 | 34 | 35 |
|---|---|---|---|---|
| Rosin, parts by weight | 100 | 100 | 100 | 100. |
| Aldehyde, parts by weight | 5 | 5 | 5 | 4. |
| Aldehyde | Benzaldehyde | Paraformaldehyde | Paraldehyde | Paraformaldehyde. |
| Metal compounds, parts by weight | 10 | 16.7 | 16.7 | 35. |
| Metal compounds | ZnO | $Al(OH) \cdot (C_2H_3O_2)_2$ | $Al(OH) \cdot (C_2H_3O_2)_2$ | $2PbCO_3 \cdot Pb(OH)_2$. |
| Reaction time, hours | 6 | 2 | 5 | 1. |
| Maximum reaction temperature, °C | 270 | 300 | 290 | 250. |
| Color grade | I | H | I | G. |
| Melting point, ring and ball, °C | 104 | (¹) | Over 180 | (¹). |
| Time in hours to dissolve 20% solids in petroleum naphtha (B. P. 95-115° C.) | 1/6 | 3 | 2 | 1. |

| Example number | 36 | 37 | 38 | 39 | 40 |
|---|---|---|---|---|---|
| Rosin, parts by weight | 100 | 100 | 100 | 100 | 100. |
| Aldehyde, parts by weight | 5 | 5 | 5 | 5 | 5. |
| Aldehyde | Paraldehyde | Paraformaldehyde | Paraformaldehyde | Paraformaldehyde | Paraformaldehyde. |
| Metal compounds, parts by weight | 35 | 48 | 34.1 | 35 | 33.3. |
| Metal compounds | $2PbCO_3 \cdot Pb(OH)_2$ | $LiC_2H_3O_2 2H_2O$ | $KC_2H_3O_2$ | $Mg(C_2H_3O_2)_2 4H_2O$ | $Sr(C_2H_3O_2)_2 \frac{1}{2}H_2O$. |
| Reaction time, hours | 4 | 3 | 1½ | 2 | 2. |
| Maximum reaction temperature, °C | 250 | 260 | 240 | 270 | 290. |
| Color grade | H | F | I | F | I. |
| Melting point, ring and ball, °C | 156 | 115 | 115 | 160 | 143. |
| Time in hours to dissolve 20% solids in petroleum naphtha (B. P. 95-115° C.) | 1/2 | Soluble in $H_2O$ | Soluble in $H_2O$ | 4 | 2. |

| Example number | 41 | 42 | 43 | 44 | 45 |
|---|---|---|---|---|---|
| Rosin, parts by weight | 100 | 100 | 100 | 100 | 100. |
| Aldehyde, parts by weight | 5 | 5 | 5 | 8 | 5. |
| Aldehyde | Paraformaldehyde | Paraformaldehyde | Paraformaldehyde | Paraformaldehyde | Paraformaldehyde. |
| Metal compounds, parts by weight | 42.5 | 32.8 | 36.4 | 40 | 20.7. |
| Metal compounds | $Ba(C_2H_3O_2)_2 H_2O$ | $UO_2(C_2H_3O_2)_2 12H_2O$ | $Cd(C_2H_3O_2)_2 2H_2O$ | $Tl(CHO_2)$ | $As_2O_3$. |
| Reaction time, hours | 1 | 2 | 2 | 1 | 3. |
| Maximum reaction temperature, °C | 250 | 180 | 200 | 250 | 150. |
| Color grade | N | Brown | G | G | D. |
| Melting point, ring and ball, °C | 125 | 111 | 138 | 95 | 105. |
| Time in hours to dissolve 20% solids in petroleum naphtha (B. P. 95-115° C.) | 1/6 | 1/6 | 2 | 1/4 | 1. |

¹ Melting point sample shattered on cooling.

EXAMPLES 46–56

One hundred parts of WW gum rosin and 5 parts of an aldehyde were heated to about 170° C. without agitation. Agitation was commenced and the temperature raised to about 220° C. Metal compounds in the amounts and types indicated were slurried with 50 parts of acetic acid and the slurry added slowly to the reaction mixture as the temperature was raised slowly to that indicated in Table 3. After the reaction times

Table 3

METAL RESINATES PREPARED FROM ALDEHYDE-MODIFIED ROSIN

| Example number | 46 | 47 | 48 | 49 |
|---|---|---|---|---|
| Rosin, parts by weight | 100 | 100 | 100 | 100. |
| Aldehyde, parts by weight | 5 | 5 | 5 | 5. |
| Aldehyde | Paraformaldehyde | Isobutyraldehyde | Paraformaldehyde | n-hept-aldehyde. |
| Metal compounds, parts by weight | 10 | 10 | 6 | 6. |
| Metal compounds | $H_4V_2O_7$ | $H_4V_2O_7$ | $MoO_3$ | $MoO_3$. |
| Reaction time, hours | 3 | 5 | 2 | 6. |
| Maximum reaction temperature, °C | 270 | 260 | 260 | 275. |
| Color grade | Green | Green | Green | Green. |
| Melting point, ring and ball, °C | 120 | 153 | 93 | 92. |
| Time in hours to dissolve 20% solids in petroleum naphtha (B. P. 95–115° C.) | 1 | ½ | 1 | 1. |

| Example number | 50 | 51 | 52 | 53 |
|---|---|---|---|---|
| Rosin, parts by weight | 100 | 100 | 100 | 100. |
| Aldehyde, parts by weight | 5 | 5 | 5 | 5. |
| Aldehyde | Paraformaldehyde | Paraformaldehyde | Paraldehyde | Paraformaldehyde. |
| Metal compounds, parts by weight | 10 | 20 | 20 | 14.4. |
| Metal compounds | $WO_3$ | $Bi_2O_3 \cdot CO_2 \cdot H_2O$ | $Bi_2O_3 \cdot CO_2 \cdot H_2O$ | $Cr(OH)(CO_3)$. |
| Reaction time, hours | 3 | 4 | 6 | 3. |
| Maximum reaction temperature, °C | 300 | 250 | 220 | 270. |
| Color Grade | Blue | F | D | Clear Green. |
| Melting point, ring and ball, °C | 82 | 81 | 122 | 99. |
| Time in hours to dissolve 20% solids in petroleum naphtha (B. P. 95–115° C.) | ½ | ½ | 1 | ¼. |

| Example number | 54 | 55 | 56 |
|---|---|---|---|
| Rosin, parts by weight | 100 | 100 | 100. |
| Aldehyde, parts by weight | 5 | 5 | 5. |
| Aldehyde | Paraformaldehyde | Paraformaldehyde | Paraformaldehyde. |
| Metal compounds, parts by weight | 6 | 10 | 15. |
| Metal compounds | $GeO_2$ | $SnO$ | $Sb_2O_3$. |
| Reaction time, hours | 4 | 2 | 2. |
| Maximum reaction temperature, °C | 250 | 240 | 220. |
| Color grade | G | F | M. |
| Melting point, ring and ball, °C | 95 | 85 | 81. |
| Time in hours to dissolve 20% solids in petroleum naphtha (B. P. 95-115° C.) | ½ | ½ | ¼. |

EXAMPLE 57

One hundred parts of WW gum rosin and 5 parts of paraformaldehyde were heated to about 170° C. without agitation. The agitation was commenced and the temperature was increased to 230° C. A cerium compound was prepared by dissolving 36 parts of cerium oxalate

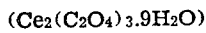

$(Ce_2(C_2O_4)_3 \cdot 9H_2O)$ in nitric acid, precipitating with sodium hydroxide and after washing and drying the precipitate, dissolving it in acetic acid. This acetic acid solution containing the cerium compound was added slowly to the hot rosin. After 3 hours, the product had a color grade of B, melting point 104° C. ring and ball, and took 20 minutes to dissolve 20% solids in petroleum naphtha.

EXAMPLE 58

One hundred parts of WW gum rosin and 5 parts of paraformaldehyde and 5 parts of butyraldehyde were heated to about 170° C. without agitation. Agitation was commenced and the temperature raised to 230° C. A cerium compound was prepared by dissolving 36 parts of cerous sulfate $(C_2(SO_4)_3 \cdot 8H_2O)$ in water, precipitating with sodium carbonate and after washing and drying the precipitate, dissolving it in acetic acid. This acetic acid solution containing the cerium compound was added slowly to the rosin-aldehyde product as the temperature was raised slowly to 260° C. After 6 hours, the product had a color grade of H, a melting point of 141° C. ring and ball, and took several hours to dissolve in petroleum naphtha. This solution gelled on standing.

EXAMPLE 59

One hundred parts of WW gum rosin and 5 parts of paraformaldehyde were heated to about 170° C. without agitation. Agitation was commenced and the temperature was raised to 230° C. A titanium compound was prepared by dissolving 10 parts of titanium dioxide ($TiO_2$) in sulphuric acid and precipitating with sodium carbonate. After washing with water and drying, the titanium compound was slurried in acetic acid. This slurry was added to the hot resin as the temperature was gradually increased to 300° C. After 4 hours, the product had a color grade of G, melting point 83° C. ring and ball, and took 30 minutes to dissolve 20% solids in petroleum naphtha (boiling point 95–115° C.). A light, white material precipitated on standing.

EXAMPLE 60

One hundred parts of WW gum rosin and 5 parts of paraldehyde were heated to about 170° C. without agitation. Agitation was commenced and the temperature was raised to 230° C. A titanium compound, prepared by adding 100 parts of acetic acid to 26.5 parts of titanium tetrachloride, was added to the hot resin slowly as the temperature was raised to 260° C. After 6 hours, the product had a color grade of B, melting point of 151° C. ring and ball, and took 1 hour to dissolve 20% solids in petroleum naphtha (boiling point 95–115° C.). Titanium content by analysis 7.14–7.19%.

EXAMPLE 61

One hundred parts of WW gum rosin and 5 parts of paraformaldehyde were heated to about 170° C. without agitation. Agitation was commenced and the temperature was increased to 230° C. A thorium compound was prepared by dissolving 20 parts of thorium nitrate in water, making this solution alkaline with sodium hydroxide and dissolving the precipitate formed in acetic acid. This solution was added to the hot resin as the temperature was raised to 250° C. After 3 hours, at 250° C. the product had a color grade of G, a melting point of 104° C. ring and ball, and took 30 minutes to dissolve 20% solids in petroleum naphtha.

EXAMPLE 62

One hundred parts of WW gum rosin and 5 parts of paraformaldehyde were heated to about 170° C. without agitation. Agitation was commenced and the temperature was raised to about 250° C. A lanthanum compound was prepared by dissolving 10 parts of lanthanum nitrate in water, precipitating with an excess of sodium carbonate, filtering, washing, and slurrying this precipitate with acetic acid. This slurry was added while the temperature was raised slowly to 250° C. After 3 hours, the product had a ring and ball melting point of 81° C. and took 20 minutes to dissolve 20% solids in petroleum naphtha. Color grade E.

EXAMPLE 63

One hundred parts of WW gum rosin and 5 parts of paraformaldehyde were heated to about 170° C. without agitation. Agitation was commenced and the temperature was raised to 230° C. Fifteen parts of zirconium acetate, dissolved in water were added slowly as the temperature was raised to 280° C. After 3 hours, the product had a color grade of F and a melting point of 128° C. ring and ball, and took ½ hour to dissolve 20% solids in petroleum naphtha.

EXAMPLE 64

One hundred parts of WW gum rosin and 5 parts of paraformaldehyde were heated to 170° C. without agitation. Agitation was commenced and the temperature raised to 250° C. A solution was prepared by dissolving 4 parts of beryllium oxide in sulphuric acid and precipitating it out with sodium hydroxide. After filtering the precipitate it was dissolved in acetic acid. The acetic acid solution of the beryllium compound was added slowly while the temperature was raised to 310° C. After 3 hours, the product had a color grade of G, melting point 128° C. ring and ball, and took 1 hour to dissolve 20% solids in petroleum naphtha.

EXAMPLES 65–66

One hundred parts of WW gum rosin and 5 parts of paraformaldehyde were heated to about 130° C. without agitation. Agitation was commenced and the rosin-formaldehyde product allowed to cool to the desired temperature. Metal compounds in the amounts and types indicated were added slowly. After the reaction times indicated, the products had the characteristics shown in Table 4.

Table 4

| Example number | 65 | 66 |
|---|---|---|
| Rosin, parts by weight | 100 | 100. |
| Paraformaldehyde, parts by weight | 5 | 5. |
| Metal compounds, parts by weight | 51.2 | 49.5. |
| Metal compounds | $AgC_2H_3O_2$ | $Hg(C_2H_3O_2)_2$. |
| Reaction time, hours | 4 | 3. |
| Maximum reaction temperature, °C | 105 | 90. |
| Color grade | Gray | F. |
| Melting point, ring and ball, °C | 100 | |
| Time in hours to dissolve 20% solids in petroleum naphtha (B. P. 95–115° C.) | 2 | 1. |

EXAMPLES 67–87

One hundred parts or its equivalent of the type rosin as indicated in Table 5 were reacted with an aldehyde to about 170° C. without agitation. Agitation was commenced and the temperature was increased to about 230° C. Metal compounds were reacted in the amounts and types indicated, as the temperature was increased to that listed in the table following. The products had the characteristics shown in Table 5.

Table 5

METAL RESINATES FROM VARIOUS ROSIN MATERIALS

| Example number | 67 | 68 | 69 | 70[1] | 71 |
|---|---|---|---|---|---|
| Rosin, parts by weight | 100 | 100 | 125 | 100 | 100. |
| Type rosin | Wood | Polymerized | Gum oleoresin | Stabilized | Resin acids. |
| Aldehydes, parts by weight | 4 | 4 | 4 | 4 | 4. |
| Aldehydes | Paraformaldehyde | Paraformaldehyde | Paraformaldehyde | Paraformaldehyde | Paraformaldehyde. |
| Metal compounds, parts by weight | 35 | 35 | 35 | 35 | 35. |
| Metal compounds | $2PbCO_3 \cdot Pb(OH)_2$ | $2PbCO_3 \cdot Pb(OH)_2$ | $2PbCO_3 \cdot Pb(OH)_2$ | $2PbCO_3 \cdot Pb(OH)_2$ | $2PbCO_3 \cdot Pb(OH)_2$. |
| Reaction time, hours | 2 | 2 | 2 | 2 | 2. |
| Maximum reaction temperature, °C | 250 | 250 | 240 | 250 | 250. |
| Color grade | B | D | B | D | D. |
| Melting point, ring and ball, °C | — | — | — | — | — |
| Time in hours to dissolve 20% solids in petroleum naphtha (B. P. 95–115° C.) | 1 | ½ | 1 | 1 | 1. |

| Example number | 72 | 73 | 74[1] | 75 | 76 |
|---|---|---|---|---|---|
| Rosin, parts by weight | 100 | 100 | 100 | 125 | 100. |
| Type rosin | Wood | Wood | Stabilized | Oleoresin | Rosin acids. |
| Aldehydes, parts by weight | 5 | 5 | 5 | 5 | 5. |
| Aldehydes | Paraformaldehyde | Paraldehyde | Paraformaldehyde | Paraformaldehyde | Paraformaldehyde. |
| Metal compounds, parts by weight | 6 | 10 | 6 | 6 | 6. |
| Metal compounds | ZnO | ZnO | ZnO | ZnO | ZnO. |
| Reaction time, hours | 2 | 6 | 6 | 5 | 3. |
| Maximum reaction temperature, °C | 250 | 275 | 250 | 250 | 250. |
| Color grade | D | D | B | F | B. |
| Melting point, ring and ball, °C | 113 | 96 | over 170 | 104 | 131. |
| Time in hours to dissolve 20% solids in petroleum naphtha (B. P. 95–115° C.) | — | ¾ | — | — | — |

[1] The stabilized rosin used in Examples 70, 74, 78, 79, and 84 was a disproportionated rosin prepared by U. S. Patent 2,239,555.
The dashes indicate this characteristic was not measured.

Table 5—Continued

METAL RESINATES FROM VARIOUS ROSIN MATERIALS—Continued

| Example number | 77 | [1] 78 | [1] 79 | 80 |
|---|---|---|---|---|
| Rosin, parts by weight | 100 | 100 | 100 | 100. |
| Type rosin | Wood | Stabilized | Stabilized | Polymerized. |
| Aldehydes, parts by weight | 5 | 5 | 5 | 5. |
| Aldehydes | Paraformaldehyde | Paraformaldehyde | Butyraldehyde | Paraformaldehyde. |
| Metal compounds, parts by weight | 41 | 41 | 41 | 41. |
| Metal compounds | $Co(C_2H_3O_2)_2 \cdot 4H_2O$ | $Co(C_2H_3O_2)_2 \cdot 4H_2O$ | $Co(C_2H_3O_2)_2 \cdot 4H_2O$ | $Co(C_2H_3O_2)_2 \cdot 4H_2O$. |
| Reaction time, hours | 2 | 2 | 4 | 2. |
| Maximum reaction temperature, °C | 280 | 280 | 275 | 280. |
| Color grade | Purple | Blue | Blue | Blue. |
| Melting point, ring and ball, °C | 117 | 132 | 117 | 142. |
| Time in hours to dissolve 20% solids in petroleum naphtha (B. P. 95–115° C.) | 1 | 5 | ½ | 5. |

| Example number | 81 | 82 | 83 | [1] 84 |
|---|---|---|---|---|
| Rosin, parts by weight | 100 | 100 | 100 | 100. |
| Type rosin | Resin acids | Hydrogenated | Wood | Stabilized. |
| Aldehyde, parts by weight | 5 | 5 | 5 | 5. |
| Aldehydes | Paraformaldehyde | Paraformaldehyde | Paraformaldehyde | Paraformaldehyde. |
| Metal compounds, parts by weight | 41 | 41 | 38 | 38. |
| Metal compounds | $Co(C_2H_3O_2)_2 \cdot 4H_2O$ | $Co(C_2H_3O_2)_2 \cdot 4H_2O$ | $Mn(C_2H_3O_2)_2 \cdot 4H_2O$ | $Mn(C_2H_3O_2)_2 \cdot 4H_2O$. |
| Reaction time, hours | 2 | 2 | 3 | 2. |
| Maximum reaction temperature, °C | 290 | 280 | 270 | 240. |
| Color grade | Blue | Blue | G | E. |
| Melting point, ring and ball, °C | 184 | 113 | 154 | 143. |
| Time in hours to dissolve 20% solids in petroleum naphtha (B. P. 95–115° C.) | 5 | 1 | 5 | 1. |

| Example number | 85 | 86 | 87 |
|---|---|---|---|
| Rosin, parts by weight | 125 | 100 | 100. |
| Type rosin | Oleoresin | Resin acids | Hydrogenated. |
| Aldehyde, parts by weight | 5 | 5 | 5. |
| Aldehydes | Paraformaldehyde | Paraformaldehyde | Paraformaldehyde. |
| Metal compounds, parts by weight | 38 | 38 | 38. |
| Metal compounds | $Mn(C_2H_3O_2)_2 \cdot 4H_2O$ | $Mn(C_2H_3O_2)_2 \cdot 4H_2O$ | $Mn(C_2H_3O_2)_2 \cdot 4H_2O$. |
| Reaction time, hours | 2 | 1½ | 2. |
| Maximum reaction temperature, °C | 270 | 270 | 250. |
| Color grade | I | D | F. |
| Melting point, ring and ball, °C | over 200 | 155 | over 200. |
| Time in hours to dissolve 20% solids in petroleum naphtha (B. P. 95–115° C.) | 3 | 8 | 2. |

[1] The stabilized rosin used in Examples 70, 74, 78, 79, and 84 was a disproportionated rosin prepared by U. S. Patent 2,239,555.

EXAMPLES 88–111

One hundred parts of WW gum rosin and aldehydes in the amounts and types as listed in Table 6 were heated to about 170° C. without agitation. Agitation was commenced and the temperature was raised to about 230° C. Zinc oxide was added slowly as the temperature was raised as indicated in Table 6. When 10 parts of zinc oxide had reacted, the resinates had the characteristics shown in Table 6.

Table 6

METAL RESINATES PREPARED USING ALDEHYDES

| Example number | 88 | 89 | 90 | 91 | 92 | 93 |
|---|---|---|---|---|---|---|
| Rosin, parts by weight | 100 | 100 | 100 | 100 | 100 | 100. |
| Aldehydes, parts by weight | 1 | 5 | 1 | 1 | 1 | 5. |
| Aldehydes | Paraldehyde | Acetaldehyde | Benzaldehyde | Dihydropyran | Propionaldehyde | n-heptaldehyde. |
| Zinc oxide, parts by weight | 10 | 10 | 10 | 10 | 10 | 10. |
| Reaction time, hours | 5 | 6 | 5½ | 6 | 6 | 6. |
| Maximum reaction temperature, °C | 260 | 275 | 275 | 260 | 260 | 260. |
| Melting point, ring and ball, °C | 123 | 121 | 140 | 113 | 111 | 105. |
| Color grade | N | M | M | K | I | G. |
| Time in hours to dissolve 20% solids in petroleum naphtha (B. P. 95–115° C.) | ¼ | ⅙ | 1/12 | ¼ | ½ | ¾. |

| Example number | 94 | 95 | 96 | 97 | 98 |
|---|---|---|---|---|---|
| Rosin, parts by weight | 100 | 100 | 100 | 100 | 100. |
| Aldehydes, parts by weight | 5 | 1 | 5 | 5 | 5. |
| Aldehydes | Butyraldehyde | Salicylaldehyde | Cinnamaldehyde | 2-ethyl-hexaldehyde | Anisaldehyde. |
| Zinc oxide, parts by weight | 10 | 10 | 10 | 10 | 10. |
| Reaction time, hours | 6 | 6 | 6 | 6 | 6. |
| Maximum reaction temperature, °C | 260 | 260 | 255 | 275 | 260. |
| Melting point, ring and ball, °C | 128 | 138 | 153 | 108 | 112. |
| Color grade | H | G | E | K | G. |
| Time in hours to dissolve 20% solids in petroleum naphtha (B. P. 95–115° C.) | 1 | ½ | 1 | ¾ | 1. |

Table 6—Continued
METAL RESINATES PREPARED USING ALDEHYDES—Continued

| Example number | 99 | 100 | 101 | 102 | 103 | 104 |
|---|---|---|---|---|---|---|
| Rosin, parts by weight | 100 | 100 | 100 | 100 | 100 | 100. |
| Aldehydes, parts by weight | 5 | 1 | 1 | 1 | 0.1 | 1. |
| Aldehydes | o-chlorobenzaldehyde | Furfural | Crotonaldehyde | Isobutyraldehyde | Glyoxal | Piperonal. |
| Zinc oxide, parts by weight | 10 | 10 | 10 | 10 | 10 | 10. |
| Reaction time, hours | 3 | 6 | 6 | 6 | 6 | 6. |
| Maximum reaction temperature, °C | 270 | 275 | 275 | 275 | 275 | 275. |
| Melting point, ring and ball, °C | 111 | 112 | 116 | 104 | 113 | 120. |
| Color grade | F | D | I | H | G | B. |
| Time in hours to dissolve 20% solids in petroleum naphtha (B. P. 95–115° C.) | ½ | ½ | ½ | 1 | ½ | ¾. |

| Example number | 105 | 106 | 107 | 108 | 109 | 110 | 111 |
|---|---|---|---|---|---|---|---|
| Rosin, parts by weight | 100 | 100 | 100 | 100 | 100 | 100 | 100. |
| Aldehyde, parts by weight | 1 | 1 | 1 | 1 | 5 | 5 | 5. |
| Aldehydes | Glucose | Acrolein | o-Nitrobenzaldehyde | Chloral | Acetal | Methylal | Stearic [1] Aldehyde. |
| Zinc oxide, parts by weight | 10 | 10 | 10 | 10 | 10 | 10 | 10. |
| Reaction time, hours | 6 | 6 | 6 | 5½ | 4 | 3 | 5. |
| Maximum reaction temperature, °C | 275 | 290 | 260 | 260 | 275 | 275 | 275. |
| Melting point, ring and ball, °C | 142 | 116 | 121 | 106 | 100 | 108 | 94. |
| Color grade | B | H | B | D | WG | N | K. |
| Time in hours to dissolve 20% solids in petroleum naphtha (B. P. 95–115° C.) | ½ | ½ | ½ | ½ | ¾ | ½ | ¼. |

[1] This aldehyde prepared according to Delaly, Bull. Soc. Chim. 53, 301–321 (1933).

EXAMPLES 112–137

One hundred parts of WW gum rosin and aldehydes, in the amounts and types indicated in Table 7 were heated to about 170° C. without agitation. Agitation was commenced and the temperature was increased to about 230° C. Metal compounds in the amounts and types indicated were added and the temperature was raised to that as listed in the table below. At the times listed the metal resinates had the characteristics shown in Table 7.

Table 7
METAL RESINATES PREPARED FROM MIXED ALDEHYDE-MODIFIED ROSIN

| Example number | 112 | 113 | 114 | 115 | 116 |
|---|---|---|---|---|---|
| Rosin, parts by weight | 100 | 100 | 100 | 100 | 100. |
| Aldehydes, parts by weight | 2 | 2 | 2 | 2 | 2. |
| | 2 | 2 | 1 | 2 | 1. |
| Aldehydes | Paraldehyde Benzaldehyde | Paraldehyde Acetaldehyde | Paraldehyde o-Chloro-benzaldehyde | Paraldehyde Butyraldehyde | Paraldehyde. Paraformaldehyde. |
| Metal compounds, parts by weight | 10 | 10 | 10 | 10 | 10. |
| Metal compounds | ZnO | ZnO | ZnO | ZnO | ZnO. |
| Reaction time, hours | 5½ | 5½ | 6 | 6 | 6. |
| Maximum reaction temperature, °C | 275 | 275 | 275 | 275 | 275. |
| Color grade | K | I | G | I | H. |
| Melting point, ring and ball, °C | 113 | 113 | 98 | 117 | 116. |
| Time in hours to dissolve 20% solids in petroleum naphtha (B. P. 95–115° C.) | ½ | ½ | ⅙ | 1 | ½. |

| Example number | 117 | 118 | 119 | 120 |
|---|---|---|---|---|
| Rosin, parts by weight | 100 | 100 | 100 | 100. |
| Aldehydes, parts by weight | 2 | 2 | 2 | 5. |
| | 1 | 1 | 2 | 2. |
| Aldehydes | Benzaldehyde Paraformaldehyde | Paraformaldehyde o-Chloro-benzaldehyde | Paraldehyde Propionaldehyde | Aqueous formaldehyde. Paraldehyde. |
| Metal compounds, parts by weight | 10 | 10 | 10 | 10. |
| Metal compounds | ZnO | ZnO | ZnO | ZnO. |
| Reaction time, hours | 6 | 6 | 6 | 6. |
| Maximum reaction temperature, °C | 275 | 260 | 275 | 260. |
| Color grade | M | F | K | F. |
| Melting point, ring and ball, °C | 108 | 117 | 110 | 125. |
| Time in hours to dissolve 20% solids in petroleum naphtha (B. P. 95–115° C.) | ½ | ½ | ½ | 1½. |

| Example number | 121 | 122 | 123 | 124 | 125 |
|---|---|---|---|---|---|
| Rosin, parts by weight | 100 | 100 | 100 | 100 | 100. |
| Aldehydes, parts by weight | 5 | 2 | 2 | 2 | 2. |
| | 2 | 2 | 2 | 2 | 2. |
| Aldehydes | Aqueous formaldehyde Benzaldehyde | Trioxane [1] Paraldehyde | Trioxane [1] Benzaldehyde | Paraldehyde Benzaldehyde | Paraldehyde. Propionaldehyde. |
| Metal compounds, parts by weight | 10 | 10 | 10 | 34.6 | 34.6. |
| Metal compounds | ZnO | ZnO | ZnO | $Zn(C_2H_3O_2)_2 \cdot 2H_2O$ | $Zn(C_2H_3O_2)_2 \cdot 2H_2O$. |
| Reaction time, hours | 6 | 6 | 6 | 6 | 6. |
| Maximum reaction temperature, °C | 260 | 275 | 275 | 275 | 275. |
| Color grade | G | M | M | E | K. |
| Melting point, ring and ball, °C | 160 | 115 | 113 | 101 | 110. |
| Time in hours to dissolve 20% solids in petroleum naphtha (B. P. 95–115° C.) | 1 | ½ | ½ | ¼ | ½. |

[1] Trioxane is the trade name for Du Pont's trioxymethylene.

Table 7—Continued
METAL RESINATES PREPARED FROM MIXED ALDEHYDE-MODIFIED ROSIN—Continued

| Example number | 126 | 127 | 128 | 129 |
|---|---|---|---|---|
| Rosin, parts by weight | 100 | 100 | 100 | 100. |
| Aldehydes, parts by weight | 2<br>2 | 5<br>2 | 2<br>2 | 2.<br>2. |
| Aldehydes | Paraldehyde<br>Propionaldehyde | Aqueous formaldehyde<br>Paraldehyde | Trioxane [1]<br>Paraldehyde | Trioxane [1].<br>Benzaldehyde. |
| Metal compounds, parts by weight | 1<br>10 | 1<br>10 | 1<br>10 | 1.<br>10. |
| Metal compounds | $Zn(C_2H_3O_2)_2 \cdot 2H_2O$<br>ZnO | $Zn(C_2H_3O_2)_2 \cdot 2H_2O$<br>ZnO | $Zn(C_2H_3O_2)_2 \cdot 2H_2O$<br>ZnO | $Zn(C_2H_3O_2)_2 \cdot 2H_2O$.<br>ZnO. |
| Reaction time, hours | 2 | 2 | 3 | 3. |
| Maximum reaction temperature, °C | 275 | 275 | 275 | 275. |
| Color grade | K | M | M | M. |
| Melting point, ring and ball, °C | 116 | 117 | 111 | 105. |
| Time in hours to dissolve 20% solids in petroleum naphtha (B. P. 95-115° C.) | ⅓ | ⅓ | ½ | ½. |

| Example number | 130 | 131 | 132 | 133 |
|---|---|---|---|---|
| Rosin, parts by weight | 100 | 100 | 100 | 100. |
| Aldehydes, parts by weight | 5 | 2<br>2 | 2<br>2 | 2.<br>2. |
| Aldehydes | Paraldehyde | Paraldehyde<br>Propionaldehyde | Paraldehyde<br>Butyraldehyde | Trioxane.[1]<br>Paraldehyde. |
| Metal compounds, parts by weight | 0.2<br>1<br>9 | 1<br>10 | 1<br>10 | 0.2.<br>1.<br>9. |
| Metal compounds | Zn metal<br>$Zn(C_2H_3O_2)_2 \cdot 2H_2O$<br>ZnO | $Ca(C_2H_3O_2)_2 \cdot 2H_2O$<br>ZnO | $Ca(C_2H_3O_2)_2 \cdot 2H_2O$<br>ZnO | Zn metal.<br>$Ca(C_2H_3O_2)_2 \cdot H_2O$.<br>ZnO. |
| Reaction time, hours | 6 | 4 | 4 | 5. |
| Maximum reaction temperature, °C | 275 | 275 | 275 | 275. |
| Color grade | K | N | N | WG. |
| Melting point, ring and ball, °C | 102 | 103 | 114 | 109. |
| Time in hours to dissolve 20% solids in petroleum naphtha (B. P. 95-115° C.) | ⅓ | ¼ | ½ | ½. |

| Example number | 134 | 135 | 136 | 137 |
|---|---|---|---|---|
| Rosin, parts by weight | 100 | 100 | 100 | 100. |
| Aldehydes, parts by weight | 2<br>2 | 2<br>2 | 2<br>2 | 2.<br>2. |
| Aldehydes | Paraldehyde<br>Butyraldehyde | Paraldehyde<br>Butyraldehyde | Trioxane [1]<br>Paraldehyde | Paraldehyde, Butyraldehyde. |
| Metal compounds, parts by weight | 1<br>10 | 1<br>1<br>9 | 0.2<br>1<br>1<br>8 | 1.<br>1.<br>9. |
| Metal compounds | $Zn(C_2H_3O_2)_2 \cdot 2H_2O$<br>ZnO | $Ca(C_2H_3O_2)_2 \cdot H_2O$<br>$Ca(OH)_2$<br>ZnO | Zn metal<br>$Ca(C_2H_3O_2)_2 \cdot H_2O$<br>$Ca(OH)_2$<br>ZnO | $Zn(C_2H_3O_2)_2 \cdot 2H_2O$.<br>$Ca(OH)_2$.<br>ZnO. |
| Reaction time, hours | 3 | 4 | 4 | 4. |
| Maximum reaction temperature, °C | 275 | 275 | 275 | 275. |
| Color grade | I | N | WG | N. |
| Melting point, ring and ball, °C | 104 | 149 | 119 | 132. |
| Time in hours to dissolve 20% solids in petroleum naphtha (B. P. 95-115° C.) | ¼ | 1 | 1 | ¾. |

[1] Trioxane is the trade name for Du Pont's trioxymethylene.

EXAMPLES 138-144

One hundred parts of WW gum rosin, aldehydes in the amounts and types indicated, and metal compounds as listed were heated to 230° C. without agitation. Agitation was commenced and the temperature raised to 275° C. After from 2 to 6 hours, the products had the characteristics listed in Table 8.

Table 8
MIXED METAL RESINATES PREPARED FROM ALDEHYDE-MODIFIED ROSIN

| Example number | 138 | 139 | 140 | 141 |
|---|---|---|---|---|
| Rosin, parts by weight | 100 | 100 | 100 | 100. |
| Aldehydes, parts by weight | 2<br>2 | 5 | 5 | 5. |
| Aldehydes | Trioxane [1]<br>Paraldehyde | Paraldehyde | Paraldehyde | Paraldehyde. |
| Metal compounds, parts by weight | 0.2<br>1<br>1<br>8 | 1<br>1<br>9 | 1<br>9 | 1.<br>1.<br>9. |
| Metal compounds | Zn metal<br>$Zn(C_2H_3O_2)_2 \cdot 2H_2O$<br>$Ca(OH)_2$<br>ZnO | $Ca(C_2H_3O_2)_2 \cdot H_2O$<br>$Ca(OH)_2$<br>ZnO | $Zn(C_2H_3O_2)_2 \cdot 2H_2O$<br>ZnO | $Zn(C_2H_3O_2)_2 \cdot 2H_2O$.<br>$Ca(OH)_2$.<br>ZnO. |
| Reaction time, hours | 4 | 1 | 2 | 2. |
| Maximum reaction temperature, °C | 275 | 275 | 275 | 275. |
| Color grade | N | WG | N | N. |
| Melting point, ring and ball, °C | 132 | 122 | 104 | 119. |
| Time in hours to dissolve 20% solids in petroleum naphtha (B. P. 95-115° C.) | ¾ | ½ | ¼ | ½. |

[1] Trioxane is the trade name for Du Pont's trioxymethylene.

Table 8—Continued

MIXED METAL RESINATES PREPARED FROM ALDEHYDE-MODIFIED ROSIN—Continued

| Example number | 142 | 143 | 144 |
|---|---|---|---|
| Rosin, parts by weight | 100 | 100 | 100. |
| Aldehydes, parts by weight | 2 | 2 | 5. |
|  | 2 | 2 | 5. |
| Aldehydes | Paraldehyde | Paraldehyde | Butyraldehyde. |
|  | Butyraldehyde | Trioxane [1] | Paraldehyde. |
| Metal compounds, parts by weight | 1 | 1 | 1. |
|  | 1 | 1 | 1. |
|  | 9 | 9 | 9. |
| Metal compounds | Ca($C_2H_3O_2$)$_2$·$H_2O$ | Ca(OH)$_2$ | Ca(OH)$_2$. |
|  | Ca(OH)$_2$ | Ca($C_2H_3O_2$)$_2$·$H_2O$ | Ca($C_2H_3O_2$)$_2$·$H_2O$. |
|  | ZnO | ZnO | ZnO. |
| Reaction time, hours | 4 | 2 | 6. |
| Maximum reaction temperature, °C | 275 | 275 | 260.[2] |
| Color grade | I | K | I. |
| Melting point, ring and ball, °C | 119 | 117 | 137. |
| Time in hours to dissolve 20% solids in petroleum naphtha (B. P. 95–115° C.) | 1 | 1½ | 1½. |

[1] Trioxane is the trade name for Du Pont's trioxymethylene.
[2] Refluxed the mixture, a trap was inserted and volatile material removed to a maximum temperature of 260° C.

EXAMPLE 145

One hundred parts of WW gum rosin, 5 parts of paraldehyde, 9 parts of zinc oxide, 1 part of calcium hydroxide, and 1 part of calcium acetate were refluxed without agitation for 5 hours. (Reflux temperature controlled at 200° C.) A trap was inserted and the volatile matter removed to a maximum temperature or 275° C. The metal resinate prepared in this manner had a color grade of I, melting point of 123° C. ring and ball, and took 45 minutes to dissolve 20% solids in petroleum naphtha (B. P. 95–115° C.).

EXAMPLE 146

One hundred parts of WW gum rosin and 0.03 part of paraldehyde were heated to about 170° C. without agitation. Agitation was commenced and the temperature was increased to 275° C. Ten parts of zinc oxide were added slowly. After 4 hours, the metal resinate had a color grade of M, a melting point of 116° C. ring and ball, and took 30 minutes to dissolve 20% solids in petroleum naphtha (B. P. 95–115° C).

EXAMPLE 147

One hundred parts of WW gum rosin and 30 parts of 2-ethyl-hexaldehyde were heated to reflux (about 200° C.). Zinc oxide was added until 10 parts were present in the mixture. Reflux was continued for 5 hours. A trap was inserted and the volatile material removed to a maximum temperature of 275° C. The metal resinate prepared in this manner had a color grade of H, a melting point of 95° C. ring and ball, and took 45 minutes to dissolve 20% solids in petroleum naphtha (B. P. 95–115° C.).

EXAMPLE 148

One hundred parts of WW gum rosin and 10 parts of paraldehyde were heated to 170° C. without agitation. Agitation was commenced and the temperature was raised to 230° C. Ten parts of zinc oxide were added as the temperature was raised to 275° C. At this temperature 1 part more (total 11 parts) of zinc oxide was added. At 5 hours, the metal resinate had a color grade of M, melting point of 108° C. ring and ball, and took 30 minutes to dissolve 20% solids in petroleum naphtha (B. P. 95–115° C.). Further addition of zinc oxide whitened the resinate, but no blocking occurred.

EXAMPLES 149–178

One hundred parts of the rosin derivatives as listed in Table 9 and aldehydes in the amounts and types indicated were heated to about 170° C. without agitation. Agitation was commenced and the temperature raised to 230° C. Metal compounds in the amounts and types listed below were added as the temperature was raised to that indicated. After from 4 to 6 hours the products had the characteristics shown in Table 9.

Table 9

METAL RESINATES PREPARED FROM ROSIN DERIVATIVES

| Example number | 149 | 150 | 151 | 152 |
|---|---|---|---|---|
| Rosin derivatives, parts by weight | 100 | 100 | 100 | 100. |
| Rosin derivatives | Methyl abietate | Ester gum | Rosin oil | Tall oil. |
| Aldehydes, parts by weight | 5 | 5 | 5 | 5. |
| Aldehydes | Paraldehyde | Butyraldehyde | Benzaldehyde | n-Heptaldehyde. |
| Metal compounds, parts by weight | 79.2 | 79.6 | 54.6 | 54.6. |
| Metal compounds | Zn($C_2H_3O_2$)$_2$·$2H_2O$ | Zn($C_2H_3O_2$)$_2$·$2H_2O$ | Zn($C_2H_3O_2$)$_2$·$2H_2O$ | Zn($C_2H_3O_2$)$_2$·$2H_2O$. |
| Reaction time, hours | 6 | 6 | 5 | 5. |
| Maximum reaction temperature, °C | 275 | 275 | 250 | 250. |
| Color grade | N | B | B | B. |
| Melting point, ring and ball, °C | 123 | 135 | Liquid | Soft rosin. |
| Time in hours to dissolve 20% solids in petroleum naphtha (B. P. 95–115° C.) | ¾ | 3 | 1, slight ppt | 1½. |

The ester gum used in the example above had an acid number of 9.
The rosin oil used in the example above had an acid number of 7.

Table 9—Continued
METAL RESINATES PREPARED FROM ROSIN DERIVATIVES—Continued

| Example number | 153 | 154 | 155 | 156 |
|---|---|---|---|---|
| Rosin derivatives, parts by weight | 100 | 100 | 100 | 50. 50. |
| Rosin derivatives | Methyl Abietate | Tall oil | Ester gum | Rosin and Methyl abietate. |
| Aldehydes, parts by weight | 1 | 0.5 | 2 | 5. |
| Aldehydes | Paraldehyde | Benzaldehyde | Butyraldehyde | Paraldehyde. |
| Metal compounds, parts by weight | 82 | 82 | 41 | 41. |
| Metal compounds | $Co(C_2H_3O_2)_2 \cdot 4H_2O$ | $Co(C_2H_3O_2)_2 \cdot 4H_2O$ | $Co(C_2H_3O_2)_2 \cdot 4H_2O$ | $Mn(C_2H_3O_2)_2 \cdot 4H_2O$ |
| Reaction time, hours | 6 | 6 | 6 | 6. |
| Maximum reaction temperature, °C | 250 | 250 | 250 | 250. |
| Color grade | Blue | Blue | Blue | E. |
| Melting point, ring and ball, °C | 160 | over 180 | 150 | 158. |
| Time in hours to dissolve 20% solids in petroleum naphtha (B. P. 95–115° C.) | 3 | 2 | 6 | 7. |

| Example number | 157 | 158 | 159 | 160 |
|---|---|---|---|---|
| Rosin derivatives, parts by weight | 100 | 100 | 100 | 100. |
| Rosin derivatives | Methyl abietate | Rosin oil | Tall oil | Flexalyn. |
| Aldehydes, parts by weight | 5 | 5 | 5 | 5. |
| Aldehydes | Paraformaldehyde | Paraformaldehyde | Paraformaldehyde | Paraformaldehyde. |
| Metal compounds, parts by weight | 41 | 51 | 41 | 41. |
| Metal compounds | $Co(C_2H_3O_2)_2 \cdot 4H_2O$ | $Co(C_2H_3O_2)_2 \cdot 4H_2O$ | $Co(C_2H_3O_2)_2 \cdot 4H_2O$ | $Co(C_2H_3O_2)_2 \cdot 4H_2O$ |
| Reaction time, hours | 2 | 2 | 3 | 2. |
| Maximum reaction temperature, °C | 240 | 280 | 290 | 280. |
| Color grade | Blue | Blue | Blue | Blue. |
| Melting point, ring and ball, °C | Elastic | Elastic | 134 | 113. |
| Time in hours to dissolve 20% solids in petroleum naphtha (B. P. 95–115° C.) | 2 | 2 | ½ | ½. |

| Example number | 161 | 162 | 163 | 164 |
|---|---|---|---|---|
| Rosin derivatives, parts by weight | 100 | 100 | 100 | 100. |
| Rosin derivatives | Ester gum | Drying oil | Methyl abietate | Rosin oil. |
| Aldehydes, parts by weight | 5 | 5 | 5 | 5. |
| Aldehydes | Paraformaldehyde | Paraformaldehyde | Paraformaldehyde | Paraformaldehyde. |
| Metal compounds, parts by weight | 41 | 41 | 37 | 38. |
| Metal compounds | $Co(C_2H_3O_2)_2 \cdot 4H_2O$ | $Co(C_2H_3O_2)_2 \cdot 4H_2O$ | $Zn(C_2H_3O_2)_2 \cdot 2H_2O$ | $Zn(C_2H_3O_2)_2 \cdot 2H_2O$ |
| Reaction time, hours | 2 | 3 | 3 | 3. |
| Maximum reaction temperature, °C | 280 | 290 | 250 | 250. |
| Color grade | Blue | Blue | Off color | B. |
| Melting point, ring and ball, °C | 141 | 149 | 53 | liquid. |
| Time in hours to dissolve 20% solids in petroleum naphtha (B. P. 95–115° C.) | ½ | ⅓ | ½ | 2. |

| Example number | 165 | 166 | 167 | 168 |
|---|---|---|---|---|
| Rosin derivatives, parts by weight | 100 | 100 | 100 | 100. |
| Rosin derivatives | Tall oil | Ester gum | Drying oil | Methyl abietate. |
| Aldehydes, parts by weight | 5 | 5 | 5 | 5. |
| Aldehydes | Paraformaldehyde | Paraformaldehyde | Paraformaldehyde | Paraformaldehyde. |
| Metal compounds, parts by weight | 96 | 110 | 100 | 41. |
| Metal compounds | $Zn(C_2H_3O_2)_2 \cdot 2H_2O$ | $Zn(C_2H_3O_2)_2 \cdot 2H_2O$ | $Zn(C_2H_3O_2)_2 \cdot 2H_2O$ | $Mn(C_2H_3O_2)_2 \cdot 4H_2O$ |
| Reaction time, hours | 3 | 4 | 3 | 2. |
| Maximum reaction temperature, °C | 170 | 270 | 270 | 250. |
| Color grade | B | D | F | liquid. |
| Melting point, ring and ball, °C | 181 | 124 | 142 | liquid. |
| Time in hours to dissolve 20% solids in petroleum naphtha (B. P. 95–115° C.) | 4 | 8 | ½ | 2. |

| Example number | 169 | 170 | 171 | 172 |
|---|---|---|---|---|
| Rosin derivatives, parts by weight | 100 | 100 | 100 | 100. |
| Rosin derivatives | Rosin oil | Tall oil | Flexalyn | Ester gum. |
| Aldehydes, parts by weight | 5 | 5 | 8 | 5. |
| Aldehydes | Paraformaldehyde | Paraformaldehyde | Paraformaldehyde | Paraformaldehyde. |
| Metal compounds, parts by weight | 82 | 40 | 38 | 38. |
| Metal compounds | $Mn(C_2H_3O_2)_2 \cdot 4H_2O$ | $Mn(C_2H_3O_2)_2 \cdot 4H_2O$ | $Mn(C_2H_3O_2)_2 \cdot 4H_2O$ | $Mn(C_2H_3O_2)_2 \cdot 4H_2O$ |
| Reaction time, hours | 2 | 2 | 2 | 3. |
| Maximum reaction temperature, °C | 140 | 200 | 240 | 260. |
| Color grade | liquid | liquid | liquid | D. |
| Melting point, ring and ball, °C | liquid | liquid | liquid | 138. |
| Time in hours to dissolve 20% solids in petroleum naphtha (B. P. 95–115° C.) | ⅙ | ½ | 1 | 3. |

| Example number | 173 | 174 | 175 |
|---|---|---|---|
| Rosin derivatives, parts by weight | 100 | 100 | 100. |
| Rosin derivatives | Drying oil | Methyl abietate | Drying oil. |
| Aldehydes, parts by weight | 5 | 5 | 5. |
| Aldehydes | Paraformaldehyde | Paraformaldehyde | Paraformaldehyde. |
| Metal compounds, parts by weight | 38 | 46.9 | 47. |
| Metal compounds | $Mn(C_2H_3O_2)_2 \cdot 4H_2O$ | $Pb(C_2H_3O_2)_2 \cdot 3H_2O$ | $Pb(C_2H_3O_2)_2 \cdot 3H_2O$. |
| Reaction time, hours | 2 | 2 | 2. |
| Maximum reaction temperature, °C | 240 | 80 | 250. |
| Color grade | H | Liquid | B. |
| Melting point, ring and ball, °C | 120 | Liquid | — |
| Time in hours to dissolve 20% solids in petroleum naphtha (B. P. 95–115° C.) | 1 | 1 | 1. |

The rosin drying oil used in Examples 162, 167, 173, and 175 was prepared by the method outlined in U. S. Patent 2,429,264.
"Flexalyn" is a trade name used for the diethylene glycol ester of rosin.
The ester gum used in the examples above had an acid number of 9.
The rosin oil used in the examples above had an acid number of 7.
The dashes in Examples 175 and 177 indicate the melting points were not obtained.

Table 9—Continued
METAL RESINATES PREPARED FROM ROSIN DERIVATIVES—Continued

| Example number | 176 | 177 | 178 |
|---|---|---|---|
| Rosin derivatives, parts by weight | 100 | 100 | 100. |
| Rosin derivatives | Rosin oil | Ester gum | Tall oil. |
| Aldehydes, parts by weight | 5 | 5 | 5. |
| Aldehydes | Paraformaldehyde | Paraformaldehyde | Paraformaldehyde. |
| Metal compounds, parts by weight | 40 | 40 | 50. |
| Metal compounds | $Pb(C_2H_3O_2)_2 \cdot 3H_2O$ | $Pb(C_2H_3O_2)_2 \cdot 3H_2O$ | $Pb(C_2H_3O_2)_2 \cdot 3H_2O$. |
| Reaction time, hours | 3 | 3 | 4. |
| Maximum reaction temperature, °C | 250 | 250 | 80. |
| Color grade | B | B | B. |
| Melting point, ring and ball, °C | Liquid | — | Liquid. |
| Time in hours to dissolve 20% solids in petroleum naphtha (B. P. 95–115° C.) | 2 | 1 | ½. |

The ester gum used in the example above had an acid number of 9.
The rosin oil used in the example above had an acid number of 7.
The dashes in Examples 175 and 177 indicate the melting points were not obtained.

EXAMPLES 179–180

One hundred parts of WW gum rosin and 5 parts of para-n-butyraldehyde (aldehyde-free type) were heated to about 170° C. without agitation. Agitation was commenced and the temperature was raised to 260° C. Metal compounds as indicated in the table following were added until the resinate blocked into a semi-crystalline mass. One drop of 6 N H2SO4 was added to the distillate from the reaction and the distillate added to the reaction. The resinate liquefied and additional metal compound as indicated was added. At the times indicated the metal resinates had the characteristics shown in Table 10.

Table 10

| Example number | 179 | 180 |
|---|---|---|
| Rosin, parts by weight | 100 | 100. |
| Aldehydes, parts by weight | 5 | 5. |
| Aldehydes | Para-n-butyraldehyde | Para-n-butyraldehyde. |
| Parts by weight of metal compound required to block | 13 | 23. |
| Additional metal compound added after H2SO, parts by weight | 48 | 18. |
| Metal compounds | $Co(C_2H_3O_2)_2 \cdot 4H_2O$ | $Mn(C_2H_3O_2)_2 \cdot 4H_2O$. |
| Reaction time, hours | 6 | 5. |
| Maximum reaction temperature, °C | 275 | 260. |
| Color grade | Blue | F. |
| Melting point, ring and ball, °C | 110 | 150. |
| Time in hours to dissolve 20% solids in petroleum naphtha (B. P. 95-115 °C.) | 1½ | 2. |

EXAMPLES 183–196

One hundred parts of WW gum rosin were heated to about 150° C. with 0.01 part paraformaldehyde, without agitation. Agitation was commenced and the temperature raised to about 230° C. Metal compounds in the amounts and types indicated were reacted as the temperature was raised slowly to that temperature listed in the table following. After the times indicated, the products had the characteristics as listed in Table 12.

Table 12
METAL RESINATES PREPARED USING 0.01% FORMALDEHYDE-MODIFIED ROSIN

| Example number | 183 | 184 | 185 | 186 |
|---|---|---|---|---|
| Rosin, parts by weight | 100 | 100 | 100 | 100. |
| Paraformaldehyde, parts by weight | 0.01 | 0.01 | 0.01 | 0.01. |
| Metal compounds, parts by weight | 41 | 35 | 6.0 | 35. |
| Metal compounds | $Co(C_2H_3O_2)_2 \cdot 4H_2O$ | $Mn(C_2H_3O_2)_2 \cdot 4H_2O$ | ZnO | $2PbCO_3 \cdot Pb(OH)_2$. |
| Reaction time, hours | 2 | 3 | 6 | 2. |
| Maximum reaction temperature, °C | 300 | 290 | 265 | 260. |
| Color grade | Blue | 1 | N | H. |
| Melting point, ring and ball, °C | 132 | over 170 | 96 | — |
| Time in hours to dissolve 20% solids in petroleum naphtha (B. P. 95-115° C.) | 2 | 6 | 4 | 2. |

| Example number | 187 | 188 | 189 | 190 | 191 |
|---|---|---|---|---|---|
| Rosin, parts by weight | 100 | 100 | 100 | 100 | 100. |
| Paraformaldehyde, parts by weight | 0.01 | 0.01 | 0.01 | 0.01 | 0.01. |
| Metal compounds, parts by weight | 25.8 | 27.3 | 15 | 34 | 16.7. |
| Metal compounds | $NaC_2H_3O_2$ | $Ca(C_2H_3O_2)_2 \cdot H_2O$ | $FeCO_3$ | $Ni(C_2H_3O_2)_2 \cdot 4H_2O$ | $Al(OH)(C_2H_3O_2)_2$. |
| Reaction time, hours | 3 | 3 | 2 | 3 | 2. |
| Maximum reaction temperature, °C | 270 | 270 | 260 | 270 | 305. |
| Color grade | F | WW | B | Green | D. |
| Melting point, ring and ball, °C | over 170 | over 170 | 97 | 143 | over 160. |
| Time in hours to dissolve 20% solids in petroleum naphtha (B. P. 95-115° C.) | Soluble in H2O | 3, alcohol present | ½ | ¾ | 1, little ppt. |

The dashes in Examples 186 and 195 indicate the melting points were not obtained.

Table 12—Continued
METAL RESINATES PREPARED USING 0.01% FORMALDEHYDE-MODIFIED ROSIN—Continued

| Example number | 192[1] | 193[1] | 194[1] | 195 | 196[2] |
|---|---|---|---|---|---|
| Rosin, parts by weight | 100 | 100 | 100 | 100 | 100. |
| Paraformaldehyde, parts by weight | 0.01 | 0.01 | 0.01 | 0.01 | 0.01. |
| Metal compounds, parts by weight | 10 | 6 | 15 | 25 | 36. |
| Metal compounds | $H_4V_2O_7$ | $MoO_3$ | $Sb_2O_3$ | $Zr(C_2H_3O_2)_4$ | Cerium salt. |
| Reaction time, hours | 3 | 3 | 3 | 3 | 3. |
| Maximum reaction temperature, °C | 280 | 280 | 200 | 300 | 290. |
| Color grade | Green | Green | H | G | B. |
| Melting point, ring and ball, °C | 108 | 87 | 100 | — | 97. |
| Time in hours to dissolve 20% solids in petroleum naphtha (B. P. 95–115° C.) | ½ | ⅓ | ½ | 1 | ½. |

[1] Examples 192, 193, and 194 were slurried in acetic acid.
[2] Example 196 was run same as Example 57.
The dashes in Examples 186 and 195 indicate the melting points were not obtained.

EXAMPLE 197

One hundred parts of WW gum rosin and 0.01% of paraformaldehyde were heated to 130° C. without agitation. Agitation was commenced and the product allowed to cool to 80° C. Twenty-five parts of copper acetate were added slowly and the agitation continued. After 3 hours, the product was a clear green and took 10 minutes to dissolve 20% solids in petroleum naphtha.

EXAMPLES 198–208

One hundred parts of WW gum rosin were heated to about 130° C. with 5 parts of paraformaldehyde without agitation. Agitation was commenced and 25 parts of paraformaldehyde were added. After the rosin-paraformaldehyde had reacted, the temperature was increased to that as listed in the table below. Metal compounds in the amounts and types were added, and the mixture stirred for the times indicated. The products had the characteristics as listed in Table 13.

Table 13
METAL RESINATES PREPARED USING 30% FORMALDEHYDE-MODIFIED ROSIN

| Example number | 198 | 199 | 200 | 201 | 202 |
|---|---|---|---|---|---|
| Rosin, parts by weight | 100 | 100 | 100 | 100 | 100. |
| Paraformaldehyde, parts by weight | 30 | 30 | 30 | 30 | 30. |
| Metal compounds, parts by weight | 25.8 | 27.3 | 15 | 34 | 16.7. |
| Metal compounds | $NaC_2H_3O_2$ | $Ca(C_2H_3O_2)_2H_2O$ | $FeCO_3$ | $Ni(C_2H_3O_2)_2 4H_2O$ | $Al(OH)(C_2H_3O_2)_2$. |
| Reaction time, hours | 3 | 2 | 3 | 2 | 2. |
| Maximum reaction temperature, °C | 270 | 320 | 270 | 260 | 305. |
| Color grade | F | G | B | Green | D. |
| Melting point, ring and ball, °C | over 170 | over 170 | 112 | shattered on cooling | over 160. |
| Time in hours to dissolve 20% solids in petroleum naphtha (B. P. 95–115° C.) | $H_2O$ soluble[1] | 6 | ¼ | 2 | ¾. |

| Example number | 203 | 204[2] | 205[2] | 206[2] | 207[3] | 208[4] |
|---|---|---|---|---|---|---|
| Rosin, parts by weight | 100 | 100 | 100 | 100 | 100 | 100. |
| Paraformaldehyde, parts by weight | 30 | 30 | 30 | 30 | 30 | 30. |
| Metal compounds, parts by weight | 25 | 10 | 6 | 15 | 50 ml | 36. |
| Metal compounds | $Cu(C_2H_3O_2)_2H_2O$ | $H_4V_2O_7$ | $MoO_3$ | $Sb_2O_3$ | $Zr(C_2H_3O_2)_4$ soln | Ce compound. |
| Reaction time, hours | 3 | 3 | 2 | 3 | 4 | 3. |
| Maximum reaction temperature, °C | 130 | 290 | 270 | 290 | 280 | 290. |
| Color grade | Green | Green | Green | F | D | B. |
| Melting point, ring and ball, °C | 111 | 133 | 102 | 120 | 141 | 108. |
| Time in hours to dissolve 20% solids in petroleum naphtha (B. P. 95–115° C.) | ½ | ½ | ¼ | ½ | ¼ | ½. |

[1] A little alcohol is necessary for complete solution.
[2] The metal compounds used in Examples 204, 205, and 206, were slurried in acetic acid before adding.
[3] Example 207 used a solution as described in Example 63.
[4] Example 208 used a cerium compound prepared as in Example 57.

EXAMPLES 209–224

One hundred parts by weight of WW gum rosin and formaldehyde in the amounts and types as listed in the table following, were heated to about 170° C. without agitation. Agitation was commenced and the temperature was raised to about 230° C. Metal compounds in the amounts and types indicated were reacted as the temperature was increased, as listed below. The products had the characteristics listed in Table 14.

Table 14
METAL RESINATES PREPARED USING DIFFERENT ALDEHYDE YIELDING MATERIALS

| Example number | 209 | 210 | 211 | 212 |
|---|---|---|---|---|
| Rosin, parts by weight | 100 | 100 | 100 | 100. |
| Formaldehyde, parts by weight | 5 | 2 | 5 | 6. |
| Type formaldehyde | Trioxymethylene[1] | Hexamethylenetetramine | Gas | Aqueous. |
| Metal compounds, parts by weight | 38 | 38 | 38 | 41. |
| Metal compounds | $Mn(C_2H_3O_2)_2 4H_2O$ | $Mn(C_2H_3O_2)_2 4H_2O$ | $Mn(C_2H_3O_2)_2 4H_2O$ | $Mn(C_2H_3O_2)_2 4H_2O$. |
| Reaction time, hours | 3 | 2 | 3 | 3. |
| Maximum reaction temperature, °C | 290 | 280 | 280 | 250. |
| Melting point, ring and ball, °C | 132 | 157 | 160 | 150. |
| Color grade | F | B | D | F. |
| Time in hours to dissolve 20% solids in petroleum naphtha (B. P. 95–115° C.) | 5 | Incompletely sol | Incompletely sol | 8. |

[1] Trioxymethylene used was Du Pont's Trioxane.

Table 14—Continued
METAL RESINATES PREPARED USING DIFFERENT ALDEHYDE YIELDING MATERIALS—Continued

| Example number | 213 | 214 | 215 | 216 |
|---|---|---|---|---|
| Rosin, parts by weight | 100 | 100 | 100 | 100. |
| Formaldehyde, parts by weight | 5 | 1 | 5 | 6. |
| Type formaldehyde | Trioxymethylene [1] | Hexamethylenetetramine | Gas | Aqueous. |
| Metal compounds, parts by weight | 41 | 41 | 41 | 41. |
| Metal compounds | $Co(C_2H_3O_2)_2 \cdot 4H_2O$ | $Co(C_2H_3O_2)_2 \cdot 4H_2O$ | $Co(C_2H_3O_2)_2 \cdot 4H_2O$ | $Co(C_2H_3O_2)_2 \cdot 4H_2O$. |
| Reaction time, hours | 2 | 2 | 2 | 4. |
| Maximum reaction temperature, °C | 275 | 275 | 260 | 270 |
| Melting point, ring and ball, °C | 129 | 141 | 146 | 122. |
| Color grade | Blue | Blue | Blue | Blue. |
| Time in hours to dissolve 20% solids in petroleum naphtha (B. P. 95–115° C.) | 1 | 1 | 1 | 1. |

| Example number | 217 | 218 | 219 | 220 |
|---|---|---|---|---|
| Rosin, parts by weight | 100 | 100 | 100 | 100. |
| Formaldehyde, parts by weight | 4 | 5 | 5 | 12. |
| Type formaldehyde | Aqueous | Trioxymethylene [1] | Hexamethylenetetramine | Gas. |
| Metal compounds, parts by weight | 7.5 | 6 | 6 | 6. |
| Metal compounds | Zn metal | ZnO | ZnO | ZnO. |
| Reaction time, hours | 5 | 4 | 1 | 4½. |
| Maximum reaction temperature, °C | 250 | 250 | 250 | 250. |
| Melting point, ring and ball, °C | 131 | 104 | 121 | 102. |
| Color grade | K | H | B | D. |
| Time in hours to dissolve 20% solids in petroleum naphtha (B. P. 95–115° C.) | 2 | 4 | 1 | 2. |

| Example number | 221 | 222 | 223 | 224 |
|---|---|---|---|---|
| Rosin, parts by weight | 100 | 100 | 100 | 100. |
| Formaldehyde, parts by weight | 4 | 4 | 1 | 5. |
| Type formaldehyde | Aqueous | Trioxymethylene [1] | Hexamethylenetetramine | Gas. |
| Metal compounds, parts by weight | 35 | 35 | 35 | 35. |
| Metal compounds | $2PbCO_3 \cdot Pb(OH)_2$ | $2PbCO_3 \cdot Pb(OH)_2$ | $2PbCO_3 \cdot Pb(OH)_2$ | $2PbCO_3 \cdot Pb(OH)_2$. |
| Reaction time, hours | 1 | 1 | 2 | 2. |
| Maximum reaction temperature, °C | 240 | 240 | 230 | 230. |
| Melting point, ring and ball, °C | — | — | — | — |
| Color grade | N | WG | B | B. |
| Time in hours to dissolve 20% solids in petroleum naphtha (B. P. 95–115° C.) | 3 | 1 | 1 | 3. |

[1] Trioxymethylene used was Du Pont's Trioxane.
The dashes in Examples 221–224 indicate the melting points were not obtained on these metal resinates.

EXAMPLES 225–228

Five hundred parts of WW gum rosin and 150 parts of paraformaldehyde were heated to 200° C. with agitation in a pressure bomb for 3 hours. One hundred parts of this rosin-formaldehyde product were heated to about 230° C. with agitation. Metal compounds in the amounts and types indicated were reacted as the temperature was increased. After the times listed, the products had the characteristics listed in Table 15.

EXAMPLES 229–232

One hundred parts of WW gum rosin were heated to about 170° C. with the amounts of paraformaldehyde as indicated in the table below without agitation. Agitation was commenced and 35 parts of manganese acetate were added as the temperature was raised as listed in the following table. After from 2 to 3 hours, the products had the characteristics as indicated in Table 16.

Table 16
MANGANESE RESINATES PREPARED USING FORMALDEHYDE-MODIFIED ROSIN

| Example number | 229 | 230 | 231 | 232 |
|---|---|---|---|---|
| Rosin, parts by weight | 100 | 100 | 100 | 100 |
| Paraformaldehyde, parts by weight | 1 | 2 | 3 | 4 |
| Manganese acetate, parts by weight | 35 | 35 | 35 | 35 |
| Reaction time, hours | 3 | 2 | 2 | 2 |
| Maximum reaction temperature, °C | 300 | 270 | 280 | 270 |
| Melting point, ring and ball, °C | 158 | 146 | 152 | 167 |
| Color grade | B | H | G | G |
| Solubility, time in hours to dissolve 20% solids in petroleum naphtha (B. P. 95–115° C.) | 5 | 6 | 5 | 5 |

EXAMPLES 233–240

One hundred parts of WW gum rosin and aldehydes in the amounts indicated in the following table were heated to about 170° C. without agitation. The agitation was commenced and the temperature was increased to 230° C. Forty-one parts of manganese acetate $[Mn(C_2H_3O_2)_2 \cdot 4H_2O]$ were added slowly as the temperature was increased to

Table 15

| Example number | 225 | 226 | 227 | 228 |
|---|---|---|---|---|
| Rosin, formaldehyde product, parts by weight, containing 30% formaldehyde | 100 | 100 | 100 | 100. |
| Metal compounds, parts by weight | 38 | 41 | 12 | 40. |
| Metal compound | $Mn(C_2H_3O_2)_2 \cdot 4H_2O$ | $Co(C_2H_3O_2)_2 \cdot 4H_2O$ | ZnO | $2PbCO_3 \cdot Pb(OH)_2$ |
| Reaction time, hours | 2 | 3 | 1 | 1. |
| Maximum reaction temperature, °C | 300 | 280 | 270 | 245. |
| Color grade | B | Blue | E | B. |
| Melting point, ring and ball, °C | shattered on cooling | 175 | 149 | — |
| Time in hours to dissolve 20% solids in petroleum naphtha (B. P. 95–115° C.) | 5 | 2 | 5 | 4. |

The dash in Example 228 indicates the melting point was not obtained.

that as shown in Table 17. After from 5 to 6 hours, the products had the characteristics shown in Table 17.

parts of manganese acetate [Mn(C₂H₃O₂)₂·4H₂O] were added slowly as the temperature was increased to 275° C. After 6 hours reaction time Table 17

MANGANESE RESINATES PREPARED USING ALDEHYDE-MODIFIED ROSIN

| Example number | 233 | 234 | 235 | 236 | 237 | 238 | 239 | 240 |
|---|---|---|---|---|---|---|---|---|
| Rosin, parts by weight | 100 | 100 | 100 | 100 | 100 | 100 | 100 | 100. |
| Aldehydes, parts by weight | 30 | 3 | 4 | 5 | 5 | 1 | 3 | 0.1. |
| Aldehydes | 2-ethyl-hex-aldehyde. | Butyralde-hyde. | Benzalde-hyde. | Acetal | Methylal | Paraldehyde | Paraldehyde | Paraldehyde. |
| Manganese acetate, parts by weight | 41 | 41 | 41 | 41 | 41 | 41 | 41 | 41. |
| Total reaction time, hours | 4 | 6 | 6 | 6 | 6 | 5 | 5 | 5. |
| Maximum reaction temperature, °C | 275 | 275 | 275 | 275 | 250 | 275 | 275 | 275. |
| Melting point, ring and ball, °C | 145 | 149 | 150 | 151 | 149 | 150 | 149 | 141. |
| Color grade | E | D | I | G | H | G | G | G. |
| Solubility, time in hours to dissolve 20% solids in petroleum naphtha (B. P. 95-115° C.) | 6 | 8 | 8 | 4 | 5 | 8 | 6 | 8. |

EXAMPLES 241–243

Mixed rosin and rosin derivatives in the amounts and types indicated were heated to about 170° C. with 5 parts of paraformaldehyde without agitation. Agitation was commenced and the temperature was raised to about 200° C. Manganese acetate was added as the temperature was raised to that indicated in Table 18.

the resinate had a color grade of I, melting point of 145° C., ring and ball, and required 5 hours to dissolve 20% solids in petroleum naphtha (B. P. 95-115° C.).

EXAMPLE 248

One hundred parts of WW gum rosin, one part of methyl abietate, and 5 parts of paraformaldehyde were heated to about 170° C. without agita- Table 18

MANGANESE RESINATES USING MIXED ROSIN MATERIALS

| Example number | 241 | 242 | 243 |
|---|---|---|---|
| Rosin, parts by weight | 50 | 100 | 100. |
| Rosin derivative, parts by weight | 50 | 1 | 1. |
| Type rosin derivative | methyl rosinate | rosin oil | methyl rosinate. |
| Paraformaldehyde, parts by weight | 5 | 5 | 5. |
| Manganese acetate, parts by weight | 74 | 44.5 | 41. |
| Total reaction time, hours | 3 | 3 | 3. |
| Maximum reaction temperature, °C | 270 | 270 | 250. |
| Melting point, ring and ball, °C | over 170 | over 170 | 145. |
| Color grade | D | G | E. |
| Solubility, time in hours to dissolve 20% solids in petroleum naphtha (B. P. 95-115° C.) | 8 | 8 | 8. |

EXAMPLES 244–246

One hundred parts of WW gum rosin were heated with 5 parts of paraformaldehyde to 170° C. without agitation. Agitation was commenced and the temperature raised to about 230° C. Manganese compounds in the amounts and types listed were added as the temperatures were increased as indicated. The products gave the results as indicated in Table 19.

Table 19

MANGANESE RESINATES PREPARED USING MANGANESE COMPOUNDS

| Example number | 244 | 245 | 246 |
|---|---|---|---|
| Rosin, parts by weight | 100 | 100 | 100. |
| Paraformaldehyde, parts by weight | 5 | 5 | 5. |
| Manganese compounds, parts by weight | 20 [1] | 10 | 18.5. |
| Type manganese compound | MnCl₂ | MnO₂ | MnCO₃. |
| Total reaction time, hours | 4 | 1 | 3. |
| Maximum reaction temperature, °C | 300 | 280 | 280. |
| Melting point, ring and ball, °C | liquid | over 200 | 164. |
| Solubility time in hours to dissolve 20% solids in petroleum naphtha (B. P. 95-115° C.) | ½ | 3 | 5. |

[1] Part of the manganese chloride added did not react.

EXAMPLE 247

One hundred parts of WW gum rosin, 2.5 parts of propionaldehyde, and 2.5 parts of isobutyraldehyde were heated to about 170° C. without agitation. The agitation was commenced and the temperature was increased to 230° C. Forty-one tion. Agitation was commenced and the temperature raised to about 230° C. Manganese acetate was added until 41 parts of manganese acetate were reacted and the temperature increased to 250° C. The product was poured after 3 hours reaction time and had a color grade of F, M. P. 145° C. ring and ball, and was soluble in petroleum naphtha and turpentine.

EXAMPLE 249

One hundred parts of WW gum rosin, 38 parts of manganese acetate, and 5 parts of paraformaldehyde were heated altogether to about 170° C. without agitation. Agitation was commenced and the temperature was raised to about 230° C. The product was poured after 1½ hours reaction time and had a color grade of I, M. P. 161° C., ring and ball, and was soluble in petroleum naphtha and turpentine.

EXAMPLE 250

One hundred parts of WW gum rosin were heated to about 170° C. without agitation. Agitation was commenced and the temperature was raised to about 230° C. Manganese acetate was added until the material blocked. This occurred at 16.0 parts of manganese actate at a temperature of 260° C. The temperature was raised and additional manganese acetate added until the material blocked again. This occurred at 290° C. and 25.0 parts of manganese acetate. Five parts of paraformaldehyde were added and the agitation continued. The product liquefied in 30 minutes and reacted with an additional 14 parts of manganese acetate to yield a manganese resinate having a melting point above 180° C. and a color grade of B. This product was not completely soluble in petroleum naphtha, but was soluble in turpentine.

EXAMPLE 251

Fifty parts of WW gum rosin, fifty parts of methyl abietate, and 5 parts of paraldehyde were heated to about 170° C. without agitation. Agitation was commenced and the temperature was raised to 230° C. Forty-one parts of $$Mn(C_2H_3O_2)_2 \cdot 4H_2O$$

were added slowly as the temperature was raised to 250° C. After a total reduction time of 5 hours, a clear soluble resin with a color grade of E and a melting point (ring and ball) of 158° C. was obtained. Two grams of this resin completely dissolved in 10 grams of petroleum naphtha after shaking for 7 hours.

EXAMPLE 252

One hundred parts of WW gum rosin and 5 parts of dihydropyran were heated to about 170° C. without agitation. Agitation was commenced and the temperature was increased to 230° C. Thirty-eight parts of manganese acetate $[Mn(C_2H_3O_2)_2 \cdot 4H_2O]$ were added slowly as the temperature was increased to 250° C. After 2 hours reaction time the product had a color grade of N, melting point of 157° C., ring and ball, and required 8 hours to dissolve in petroleum naphtha (B. P. 95–115° C.).

EXAMPLE 253

One hundred parts of WW gum rosin and 5 parts of paraformaldehyde were heated to about 170° C. without agitation. Agitation was commenced and the temperature was increased to 250° C. Thirty-five parts of manganese acetate $[Mn(C_2H_3O_2)_2 \cdot 4H_2O]$ and 2 parts of manganese carbonate $[MnCO_3]$ were added slowly as the temperature was increased to 300° C. After 4 hours, the product was a clear, homogeneous resin. In order to determine the maximum temperature at which this resinate could be heated without noticeable decomposition, the temperature was raised to 350° C. for 1 hour and further increased to 380° C. and held at this temperature for 1.5 hours. Since no appreciable decomposition had occurred during the previous heating, the temperature was raised to 400° C. and held at this point for ½ hour. Only a small amount of volatile oil distilled during this heating. The product had a melting point of 122° C. ring and ball. Only a slight precipitate separated out upon dissolving the resin (20% solids) in petroleum naphtha (B. P. 95–115° C.).

EXAMPLE 254

Three hundred parts of WW gum rosin and 88.6 parts of paraldehyde were charged in a pressure bomb and the temperature raised to 200° C. After 4 hours' agitation the bomb was allowed to cool to room temperature. The product from the reaction was dissolved in petroleum naphtha and the unreacted aldehyde and naphtha removed by steam distillation. The resulting rosin-paraldehyde reaction product had a color grade of E.

One hundred parts of the above product were heated to about 170° C. without agitation. The agitation was commenced and the temperature raised to 260° C. Thirty-nine parts of manganese acetate were added slowly over a period of 4 hours. The heating and agitation were continued for a total of 4½ hours. The product had a color grade of D, melting point 148° C. ring and ball, and required 6 hours to dissolve (20% solids) in petroleum naphtha (B. P. 95–115° C.).

EXAMPLE 255

Five hundred parts of WW gum rosin and 500 parts of heat bodied linseed oil were heated at 275° C. with agitation for 4 hours. Six hundred parts of turpentine were added and this varnish stock solution was allowed to cool to room temperature.

A turpentine solution of the manganese resinate from Example 21 was prepared. A sufficient quantity of this solution was added to 100 parts of the varnish stock solution to give the drier concentration shown in Table 20. The effect of using this manganese resinate as a drier in conjunction with cobalt and lead driers was also checked. The varnish containing the drier was then diluted to a "D" viscosity on the Gardner-Holdt scale.

Glass test plates were prepared by dipping 3 x 5 glass plates in the varnish solution and allowing them to stand at a 45° angle for the times indicated in the following table.

Table 20

EVALUATION OF ALDEHYDE-MODIFIED MANGANESE RESINATES AS DRIERS

| Drier | Grams metal/100 grams stock solution | Time, hours | Sward Hardness |
|---|---|---|---|
| None | None | 96 | 0 |
| Mn | 0.16 | 24 | 16 |
| Mn | 0.16 | 72 | 22 |
| Mn | 0.16 | 96 | 26 |
| Co-Pb-Mn | 0.05Co-0.05Pb-0.05Mn | 72 | 26 |
| Co-Pb | 0.08Co-0.08Pb | 72 | 16 |

EXAMPLES 256–260

One hundred parts of WW gum rosin were heated to about 170° C. with 5 parts of paraformaldehyde without agitation. Agitation was commenced and the temperature increased to about 230° C. Cobalt salts as indicated below were added as the temperature was increased. After the reaction times indicated, the products gave the solubilities and melting points as listed in Table 21.

Table 21

| Example number | 256 | 257 | 258 | 259 | 260 |
|---|---|---|---|---|---|
| Rosin-parts by weight | 100 | 100 | 100 | 100 | 100 |
| Paraformaldehyde, parts by weight | 5 | 5 | 5 | 5 | 10 |
| Cobalt salts, parts by weight | 25.3 | 18.0 | 16.0 | 40 | 50.6 |
| Type cobalt salts | $Co_2O_3$ | $CoCO_3$ | $Co(OH)_2$ | $Co_2O_3$ | $Co_2O_3$ |
| Total reaction time, hours | 2 | 2 | 1 | 3 | 4 |
| Maximum reaction temp., °C | 270 | 270 | 290 | 300 | 300 |
| Melting point, °C. (ring and ball) | 118 | 117 | over 200 | 75 | 76 |
| Time in hours to dissolve 40% solids in petroleum naphtha (95–115° C.) | 1 | 1 | 1 | ¼ | 1 ¼ |

[1] Slight ppt.

EXAMPLES 261-272

One hundred parts of WW gum rosin were heated to about 170° C. with paraformaldehyde as listed below without agitation. Agitation was commenced and if more than 4% of paraformaldehyde was to be used, it was added slowly in small increments. After all the paraformaldehyde had reacted, the temperature was raised to about 230° C. and cobalt acetate $$(Co(C_2H_3O_2)_2 \cdot 4H_2O)$$

was added in the amounts as listed in the table below as the temperatures were raised. After the reaction times indicated, the products gave a blue resinate and had the melting points and solubilities as shown in Table 22.

Table 22
COBALT RESINATES PREPARED FROM FORMALDEHYDE-MODIFIED ROSIN

| Example number | 261 | 262 | 263 | 264 | 265 | 266 | 267 | 268 | 269 | 270 | 271 | 272 |
|---|---|---|---|---|---|---|---|---|---|---|---|---|
| Rosin, parts by weight | 100 | 100 | 100 | 100 | 100 | 100 | 100 | 100 | 100 | 100 | 100 | 100 |
| Paraformaldehyde, parts by weight | 5 | 5 | 5 | 6 | 5 | 10 | 20 | 23 | 1.0 | 2.0 | 37 | 25 |
| Cobalt acetate, parts by weight | 25 | 30 | 37.0 | 41.0 | 100 | 164 | 200 | 246 | 82 | 100 | 285 | 350 |
| Total reaction time, hours | 2 | 2 | 4 | 1¼ | 6 | 3 | 4 | 7 | 2 | 2 | 7 | 11 |
| Maximum reaction temp., ° C | 255 | 260 | 240 | 300 | 300 | 300 | 315 | 325 | 260 | 290 | 320 | 320 |
| Melting point, ° C. (ring and ball) | 108 | 170 | 144 | 147 | 130 | 170 | 173 | 167 | 154 | 132 | ---- | ---- |
| Time in hours to dissolve 40% solids in petroleum naphtha (B. P. 95-115° C.) | ½ | 1 | ½ | ½ | ½ | 1 | 1 | 1 | ½ | ½ | (¹) | (²) |

¹ Soluble in hot naphtha. Some ppt. on cooling.
² Soluble in hot naphtha. Heavy ppt. on cooling.

Examples 268, 271, and 272 were made by reacting 4% of paraformaldehyde with the rosin and adding cobalt acetate to the reaction mixture until the reaction slows down. This was indicated by purple particles of cobalt acetate suspended in the blue resinate, more paraformaldehyde was added and the process repeated several times. The paraformaldehyde and cobalt acetate figures in these examples are the total amounts used.

No melting points or solubilities are given in Examples 271 and 272 due to rapid oxidation of products on exposure to air.

EXAMPLES 273-275

One hundred parts of WW gum rosin were heated to about 150° C. with the amounts of paraformaldehyde as listed without agitation. Agitation was commenced and the temperature was raised to about 230° C. Forty-one parts of cobalt acetate were added slowly as the temperature was increased as listed below. After the time indicated, the reactions were complete as indicated by a blue product. The products gave the melting points and solubilities as shown below.

| Example | 273 | 274 | 275 |
|---|---|---|---|
| Rosin, parts by weight | 100 | 100 | 100 |
| Paraformaldehyde, parts by weight | 0.1 | 0.05 | 0.03 |
| Cobalt acetate, parts by weight | 41 | 41 | 41 |
| Total reaction time, hours | 3 | 2 | 2 |
| Maximum reaction temperature, °C | 290 | 270 | 290 |
| Melting pt., °C. (ring and ball) | 110 | 126 | 120 |
| Time in hrs. to dissolve 40% solids in petroleum naphtha (B. P. 95-115° C.) | ½ | ½ | 1 |

EXAMPLE 276

One hundred parts of WW gum rosin were refluxed with 5 parts of paraformaldehyde in mineral spirits (B. P. 152-207° C.) for 1 hour. Twenty-seven parts of cobalt acetate were added slowly over a period of 1 hour and the reflux continued for 1 hour. The solvent was removed by distillation with a nitrogen sparge at a maximum temperature of 300° C. Total time required for reaction and distillation was 4 hours. The product had a melting point of 136° C. (ring and ball) and required 1 hour to dissolve 40% solids in petroleum naphtha (B. P. 95-115° C.).

EXAMPLE 277

One hundred parts of WW gum rosin were heated to about 170° C. without agitation. Agitation was commenced and the temperature raised to about 230° C. Cobalt acetate was added as the temperature was raised slowly to 300° C. After the resinate blocked at this temperature (16.0 g. of cobalt acetate had been added) the infusible, semicrystalline mass was cooled to 260° C. and 5 parts of paraformaldehyde were added slowly with agitation. The product liquefied after 3 parts of paraformaldehyde had been added, a total of 5 parts of paraformaldehyde was added. Cobalt acetate was then added until a total of 41 parts had reacted. The reaction was continued for 1 hour at 260° C. The product had a melting point of 142° C. and was only partially soluble in petroleum naphtha (B. P. 95-115° C.).

EXAMPLE 278

One hundred parts of WW gum rosin, 5 parts of paraformaldehyde, and 41 parts of cobalt acetate were heated together to about 230° C. without agitation. Agitation was commenced and the temperature was raised to 270° C. After a total time of 2 hours, the product gave a melting point of 137° C. and took 1 hour to dissolve 40% solids in petroleum naphtha (B. P. 95-115° C.).

EXAMPLE 279

Fifty parts of methyl-abietate and 50 parts of WW gum rosin were heated with 5 parts of paraformaldehyde to 100° C. Agitation was commenced and 30.5 parts of cobalt acetate were added slowly over a period of 2 hours. This mixture was heated for 6 hours at 100° C. The product was a blue viscous liquid at room temperature and took 1 hour to dissolve 40% solids in petroleum naphtha (B. P. 95-115° C.).

EXAMPLE 280

A varnish was prepared by heating 500 parts of WW gum rosin and 500 parts of alkali refined linseed oil at 275° C. with agitation for 4 hours. The product was diluted with 200 parts of turpentine and used as a stock solution. One part of the cobalt resinate prepared by the process outlined in Example 270 was dissolved in 4 parts of petroleum naphtha (B. P. 95-115° C.) and this solution added to 100 parts of the stock solution. The viscosity of the stock solution containing the cobalt resinate was adjusted to 1 poise by dilution with turpentine. A varnish film prepared from this product on a glass plate set to touch in 8 hours. The varnish had Sward hardness values of 6 at 24 hours, 12 at 48 hours, and 20 at 96 hours. One hundred parts of the stock solution (no cobalt being present) was diluted with turpentine to a viscosity of 1 poise. A plate prepared from this solution did not set to touch in 96 hours.

EXAMPLES 281–284

One hundred parts of WW gum rosin were heated with 4 parts of paraformaldehyde to about 120° C. without agitation. Agitation was commenced and the temperature for each example was increased to about 170° C. Basic lead carbonate was then added slowly, while the temperature was increased to that listed in the following table. After heating for 1 to 3 hours, the products were clear and had the color and solubility as indicated in Table 23.

Table 23

| Example number | 281 | 282 | 283 | 284 |
|---|---|---|---|---|
| Rosin, parts by weight | 100 | 100 | 100 | 100 |
| Paraformaldehyde, parts by weight | 4 | 4 | 4 | 4 |
| Basic lead carbonate, parts by weight | 32 | 35 | 40 | 45 |
| Reaction time, hours | 1 | 1 | 1 | 3 |
| Maximum reaction temperature, °C | 230 | 250 | 250 | 260 |
| Color grade | F | G | G | D |
| Time in hours to dissolve 40% solids in petroleum naphtha (B. P. 95–115° C.) | 1 | 1 | 1 | 3 |

EXAMPLES 285–288

One hundred parts of WW gum rosin were heated to about 170° C. with 4 parts of paraformaldehyde without agitation. Agitation was commenced and the temperature was raised slowly to about 200° C. Lead salts in the amounts and types indicated were added slowly while the temperatures were raised to about 250° C. (200° C. for litharge). After the times indicated, products of the color and solubilities indicated in Table 24 were obtained.

Table 24

| Example number | 285 | 286 | 287 | 288 |
|---|---|---|---|---|
| Rosin, parts by weight | 100 | 100 | 100 | 100. |
| Lead salts, parts by weight | 28.2 | 39.5 | 46.9 | 28. |
| Type lead salts | $Pb_3O_4$ | $PbCrO_4$ | $Pb(C_1H_1O_2)_2 \cdot 3H_2O$ | PbO. |
| Paraformaldehyde, parts by weight | 4 | 4 | 4 | 4. |
| Reaction time, hours | 1 | 1 | 1 | 2. |
| Maximum reaction temperature, °C | 250 | 245 | 250 | 200. |
| Color grade | F | Black | K | D. |
| Time in hours to dissolve 40% solids in petroleum naphtha (B.P. 95–115° C.) | ½ | ½ | 1 | 1. |

EXAMPLE 289

One hundred parts of WW gum rosin were heated to about 170° C. with 4 parts of paraformaldehyde without agitation. Agitation was commenced and the temperature raised to about 200° C. Twenty parts of litharge were added at this temperature. After complete reaction, 15 parts of basic lead carbonate were added slowly as the temperature was increased to 250° C. After 3 hours, the product obtained had a color grade of D and took 3 hours to dissolve 40% solids in petroleum naphtha (B. P. 95–115° C.).

EXAMPLE 290

One hundred parts of polymerized rosin (Grade N) prepared by the process of U. S. Patent 2,247,399 were refluxed for 3 hours, with 35 parts of absic lead carbonate in 100 ml. of xylene. The solvent was distilled to a maximum temperature of 250° C. The product had a color grade of D and took 5 hours to dissolve 40% solids in petroleum naphtha (B. P. 95–115° C.). A white material precipitated in 5 minutes on standing.

EXAMPLE 291

One hundred parts of WW gum rosin were refluxed with 4 parts of paraformaldehyde in mineral spirits (B. P. 175–200° C.) for 15 minutes. 35 parts of basic lead carbonate were added and reflux continued for 1 hour. The solvent was distilled to a maximum temperature of 250° C. The product had a color grade of D and took 1 hour to prepare a solution of 40% solids in petroleum naphtha (B. P. 95–115° C.).

EXAMPLE 292

A varnish was prepared by heating five hundred parts of WW gum rosin and 500 parts of alkali refined linseed oil at 275° C. with agitation for 4 hours. The product was diluted with 200 parts of turpentine and used as a stock solution. One part of cobalt resinate and one part of lead resinate prepared as reported in Example 287 were dissolved in 10 parts of petroleum naphtha (B. P. 95–115° C.) and this solution added to 200 parts of the stock solution. The viscosity of the stock solution containing the cobalt and lead resinates was adjusted to 1 poise by dilution with turpentine. A film of this varnish had set to touch in 8 hours. The varnish had Sward hardness values of 13 at 24 hours, 22 at 48 hours, and 26 at 96 hours. A similar varnish prepared from the same stock solution and containing the same amount of cobalt but no lead had set to touch in 8 hours, and had Sward hardness values of only 6 at 24 hours, 12 at 48 hours and 20 at 96 hours.

EXAMPLES 293–296

One hundred parts of WW gum rosin were heated with 4 parts of paraformaldehyde to about 120° C. without agitation. Agitation was commenced and the remainder of the paraformaldehyde was added slowly to the reaction mixture as the temperature was raised to about 230° C. Zinc oxide, as listed in the table below, was added slowly while the temperature was raised to 255–260° C. After heating for 3.5 to 6 hours the reaction was complete. The products formed were clear and had the grade and melting points indicated in Table 25.

Table 25

| Example number | 293 | 294 | 295 | 296 |
|---|---|---|---|---|
| Rosin, parts by weight | 100 | 100 | 100 | 100 |
| Paraformaldehyde, parts by weight | 8.0 | 5.0 | 4.0 | 5.0 |
| Zinc oxide, parts by weight | 12.0 | 12.0 | 12.0 | 14.0 |
| Total reaction time, hours | 3.5 | 3.5 | 6.0 | 6.0 |
| Color grade | G | G | G | F |
| Melting point, °C. (ring and ball) | 150 | 147 | 141 | 152 |
| Zinc content by analysis, per cent Zn | 9.0 | 8.8 | | |

EXAMPLES 297–300

One hundred parts of WW gum rosin were heated with from 0.10 part to 1.0 part of paraformaldehyde to about 150° C. without agitation. The agitation was commenced and the temperature raised to 250° C. Zinc oxide was added slowly in the amounts as listed below as the temperature was increased to 260°–270° C. The total reaction time was 5–6 hours. The grades and melting points of the products formed are listed in Table 26.

*Table 26*

| Example number | 297 | 298 | 299 | 300 |
|---|---|---|---|---|
| Rosin, parts by weight | 100 | 100 | 100 | 100 |
| Paraformaldehyde, parts by weight | 0.10 | 0.25 | 0.50 | 1.0 |
| Zinc oxide, parts by weight | 8.4 | 6.0 | 7.5 | 8.0 |
| Melting point, °C. (ring and ball) | 102 | 95 | 112 | 117 |
| Color grade | WG | M | D | F |

EXAMPLE 301

One hundred parts of WW gum rosin, 100 ml. of petroleum solvent (B. P. 150°–200° C.), 3.0 parts of paraformaldehyde, and 5.0 parts of zinc oxide were heated to reflux temperature without agitation. Reflux was continued for 3 hours and the petroleum solvent distilled. After about 50 ml. of solvent had distilled, the reaction mixture thickened; agitation was commenced and distillation continued to about 250° C. Two parts of zinc oxide were added, followed by about 6.0 parts of paraformaldehyde. Heating and agitation were continued for 3 hours. Color grade D, M. P. 114° C. (ring and ball).

EXAMPLES 302–303

One hundred parts of WW gum rosin, 100 ml. of gum spirits of turpentine, 5.0 parts of paraformaldehyde, and 5.0 parts of zinc oxide were heated to reflux for 2 hours without agitation. Agitation was commenced and the solvent distilled. The products obtained had the melting points (ring and ball) listed below.

| Example No. | Total Time | Melting Point, °C. |
|---|---|---|
| 302 | 3 | 95 |
| 303 | 4 | 96 |

EXAMPLES 304–310

Ninety parts of WW gum rosin, paraformaldehyde as listed below, zinc oxide as listed, and organic acids as listed were refluxed in approximately 60 parts by weight of petroleum solvent (B. P. 150°–200° C.) without agitation until the solution cleared. Agitation was commenced and the solvent distilled. The products obtained had the melting points (ring and ball) listed in Table 27.

*Table 27*

| Example No. | Parts Formaldehyde | Parts ZnO | Parts Acid | Type Acid | Melting Point, °C. |
|---|---|---|---|---|---|
| 304 | 3.0 | 9.0 | 4.5 | Acetic | |
| 305 | | 9.0 | 4.5 | do | |
| 306 | 3.0 | 12.0 | 15.0 | Lactic | 138–140 |
| 307 | 5.4 | 9.0 | 13.5 | Formic | 123–125 |
| 308 | 6.0 | 10.0 | 13.5 | Lactic | 125–127 |
| 309 | | 10.0 | 10.0 | do | |
| 310 | 3.0 | 12.0 | 5.0 +10.0 | do | 103–105 |

Examples 305 and 309 "blocked" upon distillation and would not liquefy even at elevated temperatures.

Example 310 "blocked" upon distillation with 5 parts of lactic acid present. Upon addition of 10 more parts of lactic acid, the reaction product slowly liquefied to give a clear refusible resin.

EXAMPLES 311–312

Ninety parts of WW gum rosin were reacted with 15 parts of lactic acid at 260° C. with agitation for ½ hour. Fifty parts of the above were heated with agitation to about 230° C. and 10 parts of zinc oxide added slowly as the temperature was increased to 260° C. No blocking was encountered. However, unreacted zinc oxide remained suspended in the reaction product.

EXAMPLE 313

Ninety parts of WW gum rosin, 2.0 parts of paraformaldehyde, 5.0 parts of zinc oxide, and 4.5 parts of acetic acid were heated for 12 hours at 250° C. with agitation. Color grade E, M. P. 99° C. (ring and ball).

EXAMPLE 314

Ninety parts of WW gum rosin, 15 parts of lactic acid, and 3.0 parts of paraformaldehyde were heated to about 260° C. for ½ hour. Fifty parts of the above were heated to about 260° C. and 5 parts of zinc oxide added with agitation. The temperature of the reaction mixture was held at 260° C. for 5 hours. At this time the product had a color grade of E, M. P. 127° C. (ring and ball).

EXAMPLE 315

One hundred parts of WW gum rosin, 5.0 parts of paraformaldehyde and 4.5 parts of formic acid were heated to about 150° C. without agitation. Agitation was commenced and the temperature raised to about 230° C.

Six parts of zinc oxide were added slowly while the temperature was raised to 250° C. After heating for 3 hours, the product gave color grade F, M. P. 119° C. (ring and ball).

EXAMPLE 316

One hundred parts of rosin (WW gum) were heated to about 230° C. with agitation. An intimate mixture of 5 parts of zinc oxide and 5 parts of paraformaldehyde was added as the temperature was increased to 250° C. Agitation and heating were continued for 5 hours. Color grade F, M. P. 102° C. (ring and ball).

EXAMPLE 317

One hundred parts of WW gum rosin were heated to about 230° C. with agitation and 3 parts of zinc oxide were added slowly while the temperature was raised to about 250° C. Some blocking occurred. Three parts more of zinc oxide were added slowly and the mixture blocked. Two parts by weight of paraformaldehyde were added to the pasty, semicrystalline mass. The mixture gradually liquefied to a clear, refusible product having a color grade D, M. P. 94° C. (ring and ball).

EXAMPLE 318

A varnish was prepared by heating 50 parts of zinc resinate (prepared as in Example 295) and 50 parts of alkali refined linseed oil at 275° C.

for 4 hours with agitation. The product had a viscosity of 27 poises. 0.05 part of cobalt and 0.05 part of lead were added as resinates to the product and this mixture diluted to a viscosity of 1 poise with turpentine. The varnish prepared in this fashion set to touch in 8 hours and had a Sward hardness value of 10 at 24 hours, 18 at 48 hours, and 24 at 72 hours.

A film of this varnish after drying 4 days on a glass plate turned white after being immersed in water for 2 hours. However, this plate recovered its original transparency upon standing 6 hours in the laboratory.

EXAMPLE 319

A varnish was prepared by heating 50 parts of zinc resinate (prepared as in Example 88) and 50 parts of alkali refined linseed oil, at 275° C. for 4 hours with agitation. The product had a viscosity of 37.2 poises. Five hundredths part of cobalt and 0.05 part of lead were added as resinates to the product and this mixture diluted to a viscosity of 1 poise with turpentine. The varnish prepared in this fashion had set to touch in 6 hours and had a Sward hardness of 12 at 16 hours, and 24 at 36 hours.

A film of this varnish after drying 4 days on a glass plate turned white after being immersed in water for 2 hours. However, this plate recovered its original transparency upon standing 8 hours in the laboratory.

EXAMPLE 320

A varnish was prepared by heating 50 parts of ordinary zinc resinate (containing no formaldehyde treated rosin) and 50 parts of alkali refined linseed oil at 275° C. for 4 hours with agitation. The product had a viscosity of 27 poises. Five hundredth part of cobalt and 0.05 part of lead were added as resinates and the mixture diluted to a viscosity of 1 poise with turpentine. A film of varnish prepared in this fashion set to touch in 8 hours and had a Sward hardness value of 18 at 24 hours, 18 at 72 hours, and 18 at 7 days.

A film of this varnish on a glass plate turned white after being immersed in water for one hour. This plate did not recover its original transparency upon standing in the open room for one week.

EXAMPLES 321–328

One hundred parts of WW gum rosin were heated with an aldehyde in the amount and type as listed in Table 28 to about 170° C. without agitation. The agitation was commenced and zinc compounds in the amounts and types indicated were added slowly as the temperature was gradually brought to that as indicated in the table. After the zinc compound had reacted, calcium hydroxide was added in the amounts indicated. After the reaction times as listed, the products had the characteristics shown in Table 28.

Table 28
CALCIUM-ZINC RESINATES

| Example number | 321 | 322 | 323 | 324 |
|---|---|---|---|---|
| Rosin, parts by weight | 100 | 100 | 100 | 100. |
| Aldehyde, parts by weight | 2 | 5 | 5 | 5. |
| Aldehyde | Paraformaldehyde | Paraldehyde | Paraldehyde | Paraldehyde. |
| Calcium compound, parts by weight | 4 | 4 | 4 | 4. |
| Calcium compound | $Ca(OH)_2$ | $Ca(OH)_2$ | $Ca(OH)_2$ | $Ca(OH)_2$. |
| Zinc compound, parts by weight | 4 | 5 | 6 | 7. |
| Zinc compound | ZnO | ZnO | ZnO | ZnO. |
| Reaction time, hours | 5.5 | 7 | 7 | 7. |
| Maximum reaction temperature, °C | 275 | 275 | 300 | 300. |
| Melting point, ring and ball, °C | 150 | 154 | 118 | 142. |
| Color grade | K | G | F | D. |
| Time in hours to dissolve 20% solids in petroleum naphtha (B. P. 95–115° C.) | 3 | 1 | 2 | 3. |

| Example number | 325 | 326 | 327 | 328 |
|---|---|---|---|---|
| Rosin, parts by weight | 100 | 100 | 100 | 100. |
| Aldehyde, parts by weight | 8 | 2 | 5 | 5. |
| Aldehyde | Paraldehyde | Paraldehyde, isobutyl aldehyde | Paraformaldehyde | Paraldehyde. |
| Calcium compound, parts by weight | 2 | 1 | 5 | 5. |
| Calcium compound | $Ca(OH)_2$ | $Ca(OH)_2$ | $Ca(OH)_2$ | $Ca(OH)_2$. |
| Zinc compound, parts by weight | 5 | 10 | 5 | 3.0. |
| Zinc compound | ZnO | ZnO | ZnO | $Zn(C_2H_3O_2)_2 \cdot 2H_2O$. |
| Reaction time, hours | 6 | 7 | 7 | 7. |
| Maximum reaction temperature, °C | 290 | 300 | 280 | 265. |
| Melting point, ring and ball, °C | 132 | 118 | 145 | 143. |
| Color grade | G | D | E | H. |
| Time in hours to dissolve 20% solids in petroleum naphtha (B. P. 95–115° C.) | 3 | 1 | 4 | 3. |

EXAMPLES 329–331

One hundred parts of WW gum rosin and five parts of paraformaldehyde were heated to 170° C. without agitation. Agitation was commenced and the temperature increased to 230° C. The mixed resinates were then prepared as follows:

*Example 329.*—Three parts of ZnO were added and the temperature raised to 250° C. Three parts of $Ca(OH)_2$ were added and the mixture agitated one hour and sampled. Three parts more of ZnO were added and the temperature raised to 270° C. and the mixture agitated one hour and sampled. Two parts more of $Ca(OH)_2$ (past theory) were added and the temperature raised to 290° C. and the mixture agitated 1 hour and poured.

*Example 330.*—Four parts of $Ca(OH)_2$ and four parts of ZnO were mixed and the mixture added slowly as the temperature was increased to 280° C. with agitation.

*Example 331.*—Three parts of $Ca(OH)_2$ were added and the ZnO added at 250° C. as the temperature was increased to 290° C.

The products were poured at the temperature listed in the table following and had the properties shown in Table 29.

Table 29
CALCIUM-ZINC RESINATES

| Example number | 329 | 330 | 331 |
|---|---|---|---|
| Rosin, parts by weight | 100 | 100 | 100. |
| Paraformaldehyde, parts by weight | 5 | 5 | 5. |
| Calcium hydroxide, parts by weight | 3, +3, +2 | 4 | 3. |
| Zinc oxide, parts by weight | 3 | 4 | 6. |
| Reaction time, hours | 1, 2, 3 | 2 | 3. |
| Maximum reaction temperature, °C | 250, 270, 290 | 280 | 290. |
| Melting point, ring and ball, °C | 161 | 129 | over 180. |
| Color grade | N, M, G | N | M. |
| Time in hours to dissolve 20% solids in petroleum naphtha (B. P. 95–115° C.) | 1 | ¼ | 6. |
| Remarks | ZnO 3+Ca(OH)₂ 3 | mixed together | little ppt. if Ca(OH)₂ is added first. |

EXAMPLES 332–335

One hundred parts of WW gum rosin were heated to 170° C. with five parts of paraformaldehyde without agitation. Agitation was commenced and the temperature was raised to about 230° C. Calcium compounds in the amounts and types indicated were added slowly as the temperatures were raised to those as indicated in the table following. After the times indicated, the products had the characteristics shown in Table 30.

Table 30
CALCIUM RESINATES PREPARED WITH FORMALDEHYDE

| Example number | 332 | 333 | 334 | 335 |
|---|---|---|---|---|
| Rosin, parts by weight | 100 | 100 | 100 | 100. |
| Paraformaldehyde, parts by weight | 5 | 5 | 5 | 5. |
| Calcium compounds, parts by weight | 11.5 | 27.3 | 15 | 8.4. |
| Type calcium compounds | Ca(OH)₂ | Ca(C₂H₃O₂)₂·H₂O | CaCO₃ | CaO. |
| Reaction time, hours | 3 | 3 | 3 | 3. |
| Maximum reaction temperature, °C | 340 | 270 | 280 | 280. |
| Melting point, ring and ball, °C | Shattered | Shattered | 100 | 148. |
| Color grade | F | I | M | H. |
| Time in hours to dissolve 20% solids in petroleum naphtha (B. P. 95–115° C.) | Soluble hot varsol, 3 hours in naphtha. | Soluble hot | little cloudy | Soluble hot. |
| Remarks | Acid No. 9 | Clear soln. hot and cold. | little ppt. from naphtha cold. | Acid No. 4.2. |

EXAMPLES 336–342

One hundred parts of WW gum rosin and varying amounts of paraformaldehyde as listed, were heated to 170° C. without agitation. Agitation was commenced and the temperature increased to 230° C. Calcium compounds in the amounts and types indicated were added slowly as the temperatures were increased to those as listed in the following table. After from 2 to 3 hours, the products had the characteristics shown in Table 31.

Table 31
CALCIUM RESINATES PREPARED USING VARIOUS AMOUNTS OF FORMALDEHYDE

| Example number | 336 | 337 | 338 |
|---|---|---|---|
| Rosin, parts by weight | 100 | 100 | 100. |
| Paraformaldehyde, parts by weight | 0.01 | 30 | 1. |
| Calcium compounds, parts by weight | 27.3 | 27.3 | 25. |
| Type calcium compounds | Ca(C₂H₃O₂)₂·H₂O | Ca(C₂H₃O₂)₂·H₂O | Ca(C₂H₃O₂)₂·H₂O. |
| Reaction time, hours | 3 | 3 | 3. |
| Maximum reaction temperature, °C | 270 | 300 | 280. |
| Melting point, ring and ball, °C | over 170 | over 170 | 158. |
| Color grade | WW | E | N. |
| Time in hours to dissolve 20% solids in petroleum naphtha (B. P. 95–115° C.) | Incomplete: OK with alcohol at 1 hour. | 1 | ¼. Alc. present. |
| Remarks | | | Some gel of solution. |

| Example number | 339 | 340 | 341 | 342 |
|---|---|---|---|---|
| Rosin, parts by weight | 100 | 100 | 100 | 100. |
| Paraformaldehyde, parts by weight | 2 | 3 | 4 | 0.01. |
| Calcium compounds, parts by weight | 25 | 25 | 25 | 8. |
| Type calcium compounds | Ca(C₂H₃O₂)₂·H₂O | Ca(C₂H₃O₂)₂·H₂O | Ca(C₂H₃O₂)₂·H₂O | Ca(OH)₂. |
| Reaction time, hours | 3 | 2 | 2 | 3. |
| Maximum reaction temperature, °C | 280 | 280 | 280 | 300. |
| Melting point, ring and ball, °C | 166 | 165 | 178 | 185. |
| Color grade | N | M | K | N (off color). |
| Time in hours to dissolve 20% solids in petroleum naphtha (B. P. 95–115° C.) | ¾. Alc. present | 6 | 8 | ¼ gels. |
| Remarks | Some gel of solution | | | |

EXAMPLES 343–347

One hundred parts of the rosin containing materials as indicated were heated with from 3 to 6 parts of paraformaldehyde until the reaction had subsided (usually around 100–150° C.). Calcium hydroxide was added, in the amounts listed in the table following, slowly as the temperatures were raised to those indicated with agitation. After the times indicated, the products had characteristics shown in Table 32.

Table 32
CALCIUM RESINATES PREPARED FROM ROSIN DERIVATIVES

| Example number | 343 | 344 | 345 | 346 | 347 |
|---|---|---|---|---|---|
| Rosin material, parts by weight | 100 | 100 | 100 | 100 | 100. |
| Type rosin material | Tall oil | Rosin oil | Drying oil | Ester gum | methyl abietate. |
| Paraformaldehyde, parts by weight | 5 | 5 | 6 | 3 | 5. |
| Calcium hydroxide, parts by weight | 10 | 10, 12 | 12 | 7½ | 6. |
| Reaction time, hours | 3 | 3, 4 | 3 | 2 | 3. |
| Maximum reaction temperature, °C | 280 | 260, 270 | 300 | 300 | 290. |
| Melting point, ring and ball, °C | elastic | liquid, liquid | over 170 | 167 | 85. |
| Color grade | F | B, B | E | D | H. |
| Time in hours to dissolve 20% solids in petroleum naphtha (B. P. 95–115° C.) | 1 | Immed.1 little ppt. | Incompletely soluble. | 8 | 3. |

The rosin oil used in example 344 had an acid number of 17.
The drying oil used in Example 345 was prepared according to the method outlined in U. S. Patent 2,429,264 and had an acid number of 60.
The ester gum used in Example 346 had an acid number of 9.
The methyl-abietate used in Example 347 had an acid number of 5.

EXAMPLES 348–350

One hundred parts of WW gum rosin and paraformaldehyde in the amounts indicated were heated to 170° C. without agitation. Agitation was commenced and the temperature was raised to 250° C. Basic aluminum acetate was added in the amounts indicated, slowly as the temperatures were raised to those listed in Table 33. After from 2 to 3 hours, the products had the characteristics shown in Table 33.

Table 33
ALUMINUM RESINATES PREPARED USING FORMALDEHYDE

| Example number | 348 | 349 | 350 |
|---|---|---|---|
| Rosin, parts by weight | 100 | 100 | 100 |
| Paraformaldehyde, parts by weight | 1 | 5 | 10 |
| Basic aluminum acetate, parts by weight | 16.7 | 8.3 | 25 |
| Reaction time, hours | 3 | 2 | 3 |
| Maximum reaction temperature, °C | 300 | 310 | 340 |
| Color grade | G | H | B |
| Time in hours to dissolve 20% solids in petroleum naphtha (B.P. 95–115° C.) | ¹ 1.5 | ¹ ½ | ¹ 4 |

¹ All aluminum resinates gel in naphtha after standing for short lengths of time.

EXAMPLES 351–355

One hundred parts of rosin material as indicated in Table 34 were heated to about 130° C. with paraformaldehyde without agitation. The agitation was commenced and the temperature raised slowly to 230° C. Basic aluminum acetate was added slowly in the amounts indicated as the temperature was increased to that as listed. After 3 hours the products had the characteristics shown in Table 34.

Table 34
ALUMINUM RESINATES PREPARED FROM DIFFERENT ROSIN DERIVATIVES

| Example number | 351 | 352 | 353 | 354 | 355 |
|---|---|---|---|---|---|
| Rosin materials, parts by weight | 100 | 100 | 100 | 100 | 100. |
| Type rosin material | Tall oil | Methyl abietate | Ester gum | Rosin Drying Oil | Rosin oil. |
| Paraformaldehyde, parts by weight | 3 | 7 | 4 | 6 | 8. |
| Basic aluminum acetate, parts by weight | 16.7 | 16.7 | 16.7 | 16.7 | 16.7. |
| Reaction time, hours | 3 | 3 | 3 | 3 | 3. |
| Maximum reaction temperature, °C | 270 | 290 | 310 | 300 | 310. |
| Color grade | B | G | F | D | B. |
| Solubility in petroleum naphtha (B. P. 95–115° C.) | Immed. liquid at room temp. | Solid at room temp. | Gells in naphtha | Incompletely soluble. | Solid at room temp. |

The methyl abietate used in Example 352 had an acid number of 5.
The ester gum used in Example 353 had an acid number of 9.
The rosin drying oil used in Example 354 was prepared according to the method outlined in U S. Patent 2,429,264 and had an acid numbe of 60.
The rosin oil used in Example 355 had an acid number of 17.

Having thus described our invention, we claim:

1. A process of preparing a refusible metal resinate product soluble in petroleum naphtha, comprising: fusing 100 parts of a rosin material; 0.01 to 30 parts of formaldehyde equivalent of a formaldehyde yielding material; and a reactive metal material which yields its metal to the rosin-formaldehyde reaction product under the conditions of the reaction, at a temperature below the decomposition temperature of the metal resinate, being in the range 90° C. to 400° C., the metal material being taken from the group consisting of the free metal, the metal oxide, hydroxide, carbonates, and the metal salts of organic carboxylic acids.

2. The process of claim 1 in which the rosin material is gum rosin and the metal material is present in an amount at least equivalent to 5 parts of an oxide of the metal.

3. The process of claim 1 in which the metal material is lead material.

4. The process of claim 1 in which the metal material is cobalt material.

5. A process of preparing a non-acidic refusible metal resinate product soluble in petroleum naphtha comprising fusing 100 parts of a rosin material: 0.01 to 30 parts of formaldehyde equivalent of a formaldehyde yielding material: and a reactive metal material which yields its metal to the rosin-formaldehyde reaction product under the conditions of the reaction: the metal material being present in an amount at least equivalent to 5 parts of an oxide of the metal and being more than that required to react completely with free carboxyl groups of the rosin material.

6. The process of claim 5 in which the rosin material has an acid number less than 20.

7. A process of preparing a refusible zinc resinate having a zinc content of at least about 5 percent, comprising: reacting a rosin material, a formaldehyde yielding material, and a zinc material, which yields its zinc to the rosin-formaldehyde reaction product under the conditions of the reaction, taken from the group consisting of zinc, zinc oxide, zinc hydroxide, zinc carbonate, and zinc salts of organic carboxylic acids, in any order, or simultaneously, at a temperature in the range 100° to 280° C.; at least part of the reaction period wherein the zinc material is present being at 230° C. or above, the zinc material being present in an amount equivalent to at least 5 percent zinc oxide by weight of the rosin material.

8. The process of preparing a clear, refusible, zinc resinate having a zinc content of at least about 5 percent by weight, comprising: heating gum rosin with a formaldehyde-yielding material at a temperature in the range 100° to 230° C., adding at least about 5% zinc oxide by weight of the gum rosin with agitation and heating in the range 230° to 280° C.

9. A process of preparing a refusible, turpentine soluble, zinc resinate having a zinc content of at least about 5 percent and a melting point no higher than about 181° C., comprising heating at above about 150° C. 100 parts of a rosin material taken from the group consisting of gum rosin, rosin acid esters, rosin acids, decarboxylated rosin, rosin drying oil, tall oil, disproportionated rosin, partially hydrogenated rosin, and partially dehydrogenated rosin; with 0.01 to 30 parts of monomeric aldehyde equivalent of an aldehyde yielding material, the monomeric aldehyde having from 1 to 18 carbon atoms, and at least five parts of zinc oxide equivalent of a reactive zinc material taken from the group consisting of zinc, zinc oxide, zinc carbonate, and zinc salts of organic carboxylic acids which yield zinc to the rosin under the conditions of the reaction.

10. A process comprising fusing with a reactive aldehyde yielding material the semi-crystalline infusible mass, formed by heating a mixture of rosin material and a metal material which yields its metal to the rosin, to convert the said infusible mass to a refusible product.

11. A process comprising heating a semi-crystalline infusible mass, formed by heating a mixture of rosin and zinc oxide, with a formaldehyde yielding material to convert the infusible mass to a refusible product.

12. A refusible, turpentine soluble, zinc resinate of formaldehyde reacted gum rosin, the zinc content being at least about 5%, the melting point being no higher than about 150° C.

13. A process of preparing a refusible metal resinate product soluble in petroleum naphtha, comprising: fusing 100 parts of a rosin material, 0.01 to 30 parts of monomeric aldehyde equivalent of an alcdehyde yielding material, the monomeric aldehyde having from 1 to 18 carbon atoms; and a reactive metal material which yields its metal to the rosin-aldehyde reaction product under the conditions of the reaction, at a temperature below the decomposition temperature of the metal resinate being in the range 90° C. to 400° C., the metal material being taken from the group consisting of the free metal, the metal oxide, hydroxide, carbonates, and the metal salts of organic carboxylic acids.

14. The process of claim 13 in which the rosin material is gum rosin and the metal material is taken from the group consisting of zinc, lead, cobalt, manganese, calcium, copper, iron, nickel, vanadium, and titanium materials.

15. The process of claim 13 in which the rosin material is gum rosin; the metal material is taken from the group consisting of zinc, lead, cobalt, manganese, calcium, copper, iron, nickel, vanadium, and titanium materials; the metal material being in an amount at least equivalent to 3 parts of an oxide of the metal.

16. The process of claim 1 in which the metal material is calcium material.

17. The process of claim 1 in which the metal material is manganese material.

18. The process of reducing the blocking tendency of a metal resinate comprising fusing the metal resinate with an aldehyde yielding material.

19. A refusible, petroleum naphtha soluble, metal resinate of aldehyde reacted resin, the metal content being at least equivalent to five parts of an oxide of the metal based upon 100 parts of the rosin.

20. A rosin-formaldehyde basic lead carbonate reaction product having from 0.01 to 30% formaldehyde equivalent and 5 to 45% basic lead carbonate equivalent, the product being soluble in mineral spirits.

21. A refusible petroleum naphtha soluble fused metal resinate of aldehyde reacted resin having from 0.01 to 30% monomeric aldehyde equivalent.

22. The product defined in claim 21 in which the metal is taken from the group consisting of zinc, cobalt, lead, manganese, calcium, copper, iron, nickel, vanadium, and titanium.

23. The product defined in claim 21 in which the metal is zinc.

24. The product defined in claim 21 in which the metal is cobalt.

25. The product defined in claim 21 in which the metal is lead.

26. The product defined in claim 21 in which the metal is manganese.

27. The product defined in claim 21 in which the metal is calcium.

28. A process of preparing a refusible metal resinate product soluble in petroleum naphtha, comprising: fusing, at a temperature below the decomposition temperature of the metal resinate product, being in the range 90° to 400° C., the rosin-aldehyde reaction product produced by heating rosin and aldehyde at about 90° to 120° and a reactive metal material which yields its metal to the rosin-aldehyde reaction product under the conditions of fusion.

29. The process of claim 13 in which the rosin material has an acid number less than 20 and the metal material is a metal acetate.

30. The process of claim 1 in which the metal material is cobalt acetate employed in an amount more than the stoichiometric equivalent based upon the carboxyl content of the rosin material, at least 5 parts formaldehyde being employed.

31. A process for the production of a petroleum naphtha soluble metal resinate, which process comprises: fusing 100 parts of a rosin material, 0.01 to 30 parts of monomeric aldehyde equivalent of an aldehyde yielding material, and a reactive metal material which yields its metal under the conditions of fusion, at a temperature below the decomposition temperature of the metal resinate.

32. A process for the production of a petroleum naphtha soluble metal resinate, which comprises fusing a rosin-aldehyde reaction product with a reactive metal material which yields its metal to the said reaction product under the conditions of fusion, the fusion being at a temperature below the decomposition temperature of the metal resinate, being in the range 90° to 400° C.

33. The process of claim 13 in which not more than 5 parts of monomeric aldehyde equivalent of an aldehyde yielding material is employed, and in which the amount of metal material is less than the stoichiometric equivalent based upon the carboxyl content of the rosin material, whereby an acidic metal resinate is produced.

WILLIAM E. ST. CLAIR.
RAY V. LAWRENCE.

REFERENCES CITED

The following references are of record in the file of this patent:

UNITED STATES PATENTS

| Number | Name | Date |
|---|---|---|
| 2,383,289 | Bried | Aug. 11, 1945 |